United States Patent
Kim et al.

(10) Patent No.: US 10,911,908 B2
(45) Date of Patent: Feb. 2, 2021

(54) ELECTRONIC DEVICE FOR PROCESSING MESSAGE AND METHOD FOR OPERATING SAME

(71) Applicant: Samsung Electronics Co., Ltd., Gyeonggi-do (KR)

(72) Inventors: Kyu-Hyun Kim, Gyeonggi-do (KR); Minsun Kim, Seoul (KR); Kisoo Park, Gyeonggi-do (KR); Young Pil Shin, Gyeonggi-do (KR); Moonsoo Chang, Gyeonggi-do (KR); Jonghyun Jin, Gyeonggi-do (KR); Eunkyung Lee, Gyeonggi-do (KR); Taihun Kang, Gyeonggi-do (KR); Wonseok Baek, Gyeonggi-do (KR); Hyunjin Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/646,794

(22) PCT Filed: Sep. 13, 2018

(86) PCT No.: PCT/KR2018/010772
§ 371 (c)(1),
(2) Date: Mar. 12, 2020

(87) PCT Pub. No.: WO2019/054779
PCT Pub. Date: Mar. 21, 2019

(65) Prior Publication Data
US 2020/0267514 A1    Aug. 20, 2020

(30) Foreign Application Priority Data
Sep. 14, 2017    (KR) .................. 10-2017-0117731

(51) Int. Cl.
*H04W 4/14*    (2009.01)
*H04L 12/58*    (2006.01)
(Continued)

(52) U.S. Cl.
CPC ............. *H04W 4/14* (2013.01); *H04L 51/066* (2013.01); *H04L 51/24* (2013.01); *H04L 51/38* (2013.01); *H04L 67/26* (2013.01); *H04L 69/08* (2013.01)

(58) Field of Classification Search
CPC ......... H04L 67/26; H04L 51/24; H04L 51/38; H04L 51/066; H04L 69/08; H04W 4/14; H04M 3/42382; H04M 1/725
See application file for complete search history.

(56) References Cited

U.S. PATENT DOCUMENTS

| | | | | |
|---|---|---|---|---|
| 8,315,252 B2* | 11/2012 | McNamara | ............. | H04L 51/24 370/356 |
| 2012/0254390 A1 | 10/2012 | Choi et al. | | |
| 2013/0212203 A1* | 8/2013 | Park | ........................ | H04L 51/38 709/206 |

FOREIGN PATENT DOCUMENTS

EP    2899945 A1 *    7/2015    ............. H04L 67/26
KR    10-2012-0045764 A    5/2012
(Continued)

OTHER PUBLICATIONS

"3GPP TS 24.341"; V16.0.0 (Dec. 2019); Stage 3; Release 16; 61 pages.
(Continued)

*Primary Examiner* — Nam T Huynh
(74) *Attorney, Agent, or Firm* — Cha & Reiter, LLC.

(57) ABSTRACT

Various embodiments of the present invention relate to an electronic device for processing a message and a method for operating the same. The electronic device comprises a display, a wireless communication circuit, a processor operatively connected to the communication circuit and to the display, and a memory operatively connected to the processor. The memory stores a first application program, which is a short message service (SMS) application pro-
(Continued)

gram, and a second application program, which is a non-SMS application program. The memory may comprise instructions that, when executed, cause the processor to: receive a push notification from an external server through the communication circuit by using the second application program, the push notification indicating a message regarding the first application program; transmit a request regarding the message to the external server through the communication circuit by using the second application program; receive the message from the external server through the communication circuit by using the second application program; provide the message to the first application program by using the second application program; and display the message by using the user interface of the first application program. Other embodiments are also possible.

15 Claims, 21 Drawing Sheets

(51) Int. Cl.
*H04L 29/08* (2006.01)
*H04L 29/06* (2006.01)

(56) References Cited

FOREIGN PATENT DOCUMENTS

| | | |
|---|---|---|
| KR | 10-2012-0110930 A | 10/2012 |
| KR | 10-2013-0050202 A | 5/2013 |
| KR | 10-2014-0070870 A | 6/2014 |
| KR | 10-2014-0099786 A | 8/2014 |
| KR | 10-2016-0013355 A | 2/2016 |
| KR | 10-1597977 B1 | 2/2016 |

OTHER PUBLICATIONS

"Google Cloud Messaging (GCM) Overview"; 3 pages; [http://theeye.pe.kr/archives/2632].

"Real Time Communication"; IP-SM-GW Transport Level Interworking; Posted on Dec. 9, 2014 by realtimecommunication.info.; https://realtimecommunication.wordpress.com/2014/12/09/ip-sm-gw-transport-level-interworking-i.

* cited by examiner

ELECTRONIC DEVICE FOR PROCESSING MESSAGE AND METHOD FOR OPERATING SAME

CROSS REFERENCE TO RELATED APPLICATIONS

This application is a National Phase Entry of PCT International Application No. PCT/KR2018/010772, which was filed on Sep. 13, 2018, and claims a priority to Korean Patent Application No. 10-2017-0117731, which was filed on Sep. 14, 2017, the contents of which are incorporated herein by reference.

TECHNICAL FIELD

Various embodiments of the disclosure relate to an electronic device for processing a message and an operation method therefor.

BACKGROUND ART

With the development of information and communication technologies and semiconductor technologies, various types of electronic devices have developed into multimedia devices that provide various multimedia services. For example, an electronic device may provide various services, such as a voice call service, a message service, a broadcast service, a wireless Internet service, a camera service, a music playback service, and a game service, by using an application installed in the electronic device.

The message service may include a short message service (SMS), a long message service (LMS), a multimedia message service (MMS), a rich communication service (RCS), a wireless application protocol push (WAP push), a push notification service, and the like.

DISCLOSURE OF INVENTION

Technical Problem

An electronic device may transmit and receive a message using SMS, LMS, or MMS. Messages using SMS, LMS, or MMS may be charged on a case-by-case basis. Therefore, in the case of a service carrier who wants to transmit a message to a large number of user electronic devices, the cost of using a service, such as SMS, LMS, or MMS, may be burdensome.

The electronic device may provide a push notification service for at least one application installed in the electronic device. For example, if a push message for a specific game application is received, a push notification message may be displayed once using the specific game application. If a user confirmation of the push notification message is detected, the electronic device may discard the push notification message without separately storing the same. Therefore, a user of the electronic device may not be able to reconfirm the push notification message once the message is confirmed.

Various embodiments of the disclosure provide a method and device for processing and managing a message received using a push notification service, as a message received using another message service in an electronic device.

Solution to Problem

According to various embodiments, an electronic device may include: a display; a wireless communication circuit; a processor operatively connected to the communication circuit and the display; and a memory operatively connected to the processor, wherein the memory stores a first application program that is a short message service (SMS) application program, and a second application program that is a non-SMS application program, and the memory stores instructions causing, when executed, the processor to: receive a push notification from an external server via the communication circuit by using the second application program, wherein the push notification displays a message relating to the first application program; transmit a request for the message to the external server via the communication circuit by using the second application program; receive the message from the external server via the communication circuit by using the second application program; provide the message to the first application program by using the second application program; and display the message by using a user interface of the first application program.

According to various embodiments, a server device may include: a network interface; at least one processor operatively connected to the interface; and at least one memory operatively connected to the processor, wherein the memory includes instructions causing, when executed, the processor to: receive first message data in a non-short message service (non-SMS) format from an external server via the interface, wherein the first message data is transmitted to a plurality of mobile devices including phone numbers; transmit a push notification including an indication of the first message data to at least one mobile device corresponding to a part of the mobile devices via the interface using an Internet protocol at least partially on the basis of the phone numbers of the mobile devices; receive a request relating to the first message data from the at least one of the mobile devices via the interface using the Internet protocol; transmit the first message data in the non-SMS format to the at least one of the mobile devices via the interface using the Internet protocol; and provide the external server with information relating to remaining mobile devices, to which the push notification is not transmitted, via the interface at least partially on the basis of phone numbers of the remaining mobile devices.

Advantageous Effects of Invention

In an electronic device and an operation method therefor according to various embodiments of the disclosure, an electronic device processes a message, which is received using a push notification service, to be displayed and stored in the same environment as that of an SMS, an LMS, or an MMS, so that user convenience for message confirmation can be improved and the burden on a service carrier due to message size limitations and message costs can be reduced.

An electronic device according to various embodiments of the disclosure can receive an SMS message by using packet data in an environment in which no circuit network exists.

An electronic device and an operation method therefor according to various embodiments of the disclosure may provide an SMS message using a push notification service without modifying a 3rd generation partnership project (3GPP) or 3GPP2 SMS standard specification.

BEST MODE FOR CARRYING OUT THE INVENTION

Figure 1:
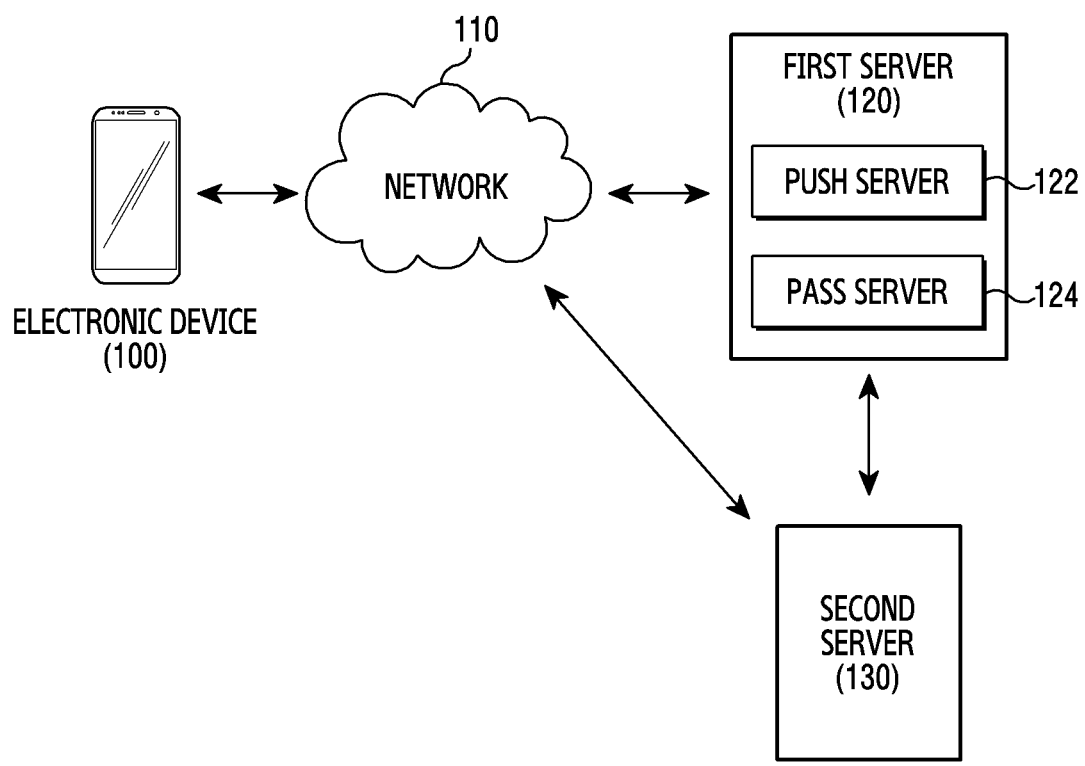
FIG. 1 illustrates a system structure according to various embodiments of the disclosure.

Hereinafter, various embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

FIG. 1 illustrates a system structure according to various embodiments of the disclosure. A system according to various embodiments may include an electronic device 100, a network 110, a first server 120, and a second server 130.

According to various embodiments, the electronic device 100 may include at least two applications. According to an embodiment, the electronic device 100 may include a first application program that is a short message service (SMS) application program, and a second application program that is a non-short message service (non-SMS) application program. According to an embodiment, the electronic device 100 may register identification information (e.g., a phone number) in the first server 120 by transmitting a service registration request signal by using the second application program. According to an embodiment, the electronic device 100 may receive a push notification and a message (or a message via the push notification) related to the push notification via the network 110 (e.g., a packet switched network) by using the second application program. According to an embodiment, the electronic device 100 may perform an integrity check for the message received using the second application program. According to an embodiment, the electronic device 100 may change a format of the message received using the second application program, and may provide the received message, the format of which has been changed, to the first application program. For example, the electronic device 100 may change the format of the message received using the second application program from a non-SMS format to an SMS format. The electronic device 100 may provide the received message, the format of which has been changed, by using a user interface of the first application program. For example, the electronic device 100 may display the received message related to the push notification by using the user interface of the SMS application program. As another example, the electronic device 100 may store the received message related to the push notification by using the SMS application program. According to an embodiment, the electronic device 100 may detect, via the user interface of the first application program, a user input related to whether to allow reception of the message received via the push notification and transmit, to the first server 120, a signal indicating whether to allow the reception, on the basis of the detected user input.

According to an embodiment, the electronic device 100 may receive an SMS (or LMS) message from the second server 130 via the network 110 (e.g., a circuit switched network) by using the first application program. According to an embodiment, the electronic device 100 may provide the receive SMS message via the user interface of the first application program. For example, the electronic device 100 may display the SMS message by using the user interface of the SMS application program. As another example, the electronic device 100 may store the SMS message by using the SMS application program.

According to various embodiments, the first server 120 may receive a non-SMS format message related to a plurality of electronic devices from the second server 130, and may perform a function for transmitting the non-SMS format message by using the push notification service. According to an embodiment, the non-SMS format message may be a message including at least a part of data conforming to the known SMS standard. For example, the non-SMS format message may include, at least in part in the message, TPDU data conforming to 3GPP or 3GPP2 SMS standard specifications. According to an embodiment, the first server 120 may transmit the non-SMS format message to at least one of the plurality of electronic devices by using the push notification service using a packet switched network. For example, the first server 120 may transmit a push notification indicating that a message exists to at least one of the plurality of electronic devices. The first server 120 may transmit, to at least one of the plurality of electronic devices, the non-SMS format message received from the second server 130, for example, the message related to the push notification, on the basis of a response of at least one electronic device among the plurality of electronic devices. According to an embodiment, the first server 120 may include a push server 122 that provides the push notification to at least one of the electronic devices, and a pass server 124 that stores the non-SMS format message received from the second server 130 and provides a non-SMS format message related to a push notification to at least one electronic device among a plurality of electronic devices. For example, the pass server 124 may be requested, by the second server 130, to transmit the non-SMS format message to the plurality of electronic devices, and may store the received non-SNS format message. The pass server 124 may, for example, provide the push server 122 with a notification that the non-SMS format message to be transmitted to at least one of the plurality of electronic devices is present. The pass server 124 may, for example, transmit the non-SMS format message in response to a request by at least one of the plurality of electronic devices. The push server 122 may provide at least one electronic device with a notification that the non-SMS format message related to the push notification is present in the pass server 124, by transmitting a push notification message to the at least one of the plurality of electronic devices in response to the request of the pass server 124. According to an embodiment, the first server 120 may store, in the pass server 124, at least one of a subscriber list including identification information (e.g., phone numbers) of electronic devices subscribing (or registered) a service and a rejection list including identification information of electronic devices having rejected to receive a message of the second server 130. Schemes of generation and/or storage of the subscriber list and the rejection list will be described in detail with reference to FIG. 14B and FIG. 14C below. The first server 120 may determine at least one electronic device to transmit a push notification and a message related to the push notification, on the basis of at least one of a receiver list, a subscriber, and a rejection list, which are received from the second server 130. The receiver list may include identification information (e.g., phone numbers) of electronic devices to which a non-SMS format message received from the second server 130 is to be transmitted. According to an embodiment, the first server 120 may identify electronic devices, to which the non-SMS format message is not transmitted, from among the electronic devices included in the receiver list, and may transmit information of the identified electronic devices to the second server 130. For example, the first server 120 may transmit, to the second server 130, information of an electronic device that is not included in the subscriber list, an electronic device included in the rejection list, or an electronic device having attempted to transmit the non-SMS format message but found to have failed, from among the electronic devices included in the receiver list.

According to various embodiments, the push server 122 and the pass server 124 may be logically or physically divided. According to various embodiments of the disclosure, for the convenience of description, the first server 120 is divided into the push server 122 and the pass server 124, but the first server 120 may not be divided into the push server 122 and the pass server 124. The disclosure is not limited thereto. For example, the push server 122 and the pass server 124 may be separate independent servers that are not included in the first server 120. Names of servers included in the first server 120 (e.g., the push server and the pass server) are referred to by way of example for the convenience of description, and according to various embodiments, names of servers may be changed.

According to various embodiments, the second server 130 may generate a non-SMS format message including a first message to be transmitted to a plurality of electronic devices. According to an embodiment, the second server 130 may transmit, to the first server 130, a non-SMS format message, and a receiver list including identification information of the electronic devices to which the non-SMS format message is to be transmitted. According to an embodiment, the non-SMS format message may be a message including at least a part of data conforming to the known SMS standard. For example, the non-SMS format message may include, at least in part in the message, TPDU data conforming to 3GPP or 3GPP2 SMS standard specifications. According to an embodiment, the second server 130 may receive information of electronic devices to which the non-SMS format message is not transmitted from the first server 130. The second server 130 may generate an SMS format message including a first message, and may transmit the SMS format message to the electronic devices, to which the non-SMS format message is not transmitted, via the network 110. For example, the second server 130 may transmit the SMS format message via a circuit switched network.

Figure 2:
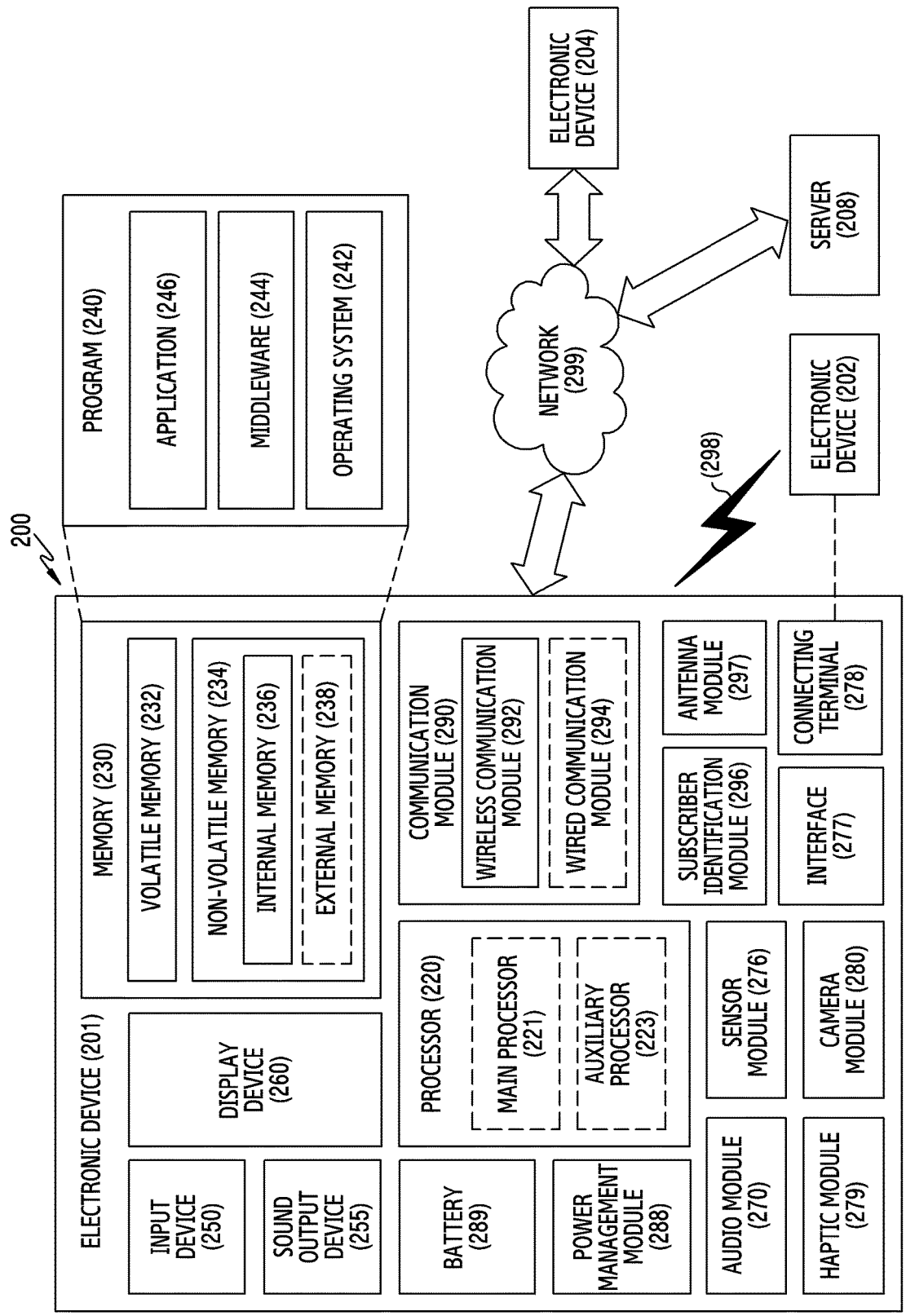
FIG. 2 is a block diagram of an electronic device within a network environment according to various embodiments of the disclosure.

FIG. 2 is a block diagram illustrating an electronic device 201 in a network environment 200 according to various embodiments.

Referring to FIG. 2, the electronic device 201 in the network environment 200 may communicate with an electronic device 202 via a first network 298 (e.g., a short-range wireless communication network), or an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments, at least one (e.g., the display device 260 or the camera module 280) of the components may be omitted from the electronic device 201, or one or more other components may be added in the electronic device 201. In some embodiments, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223. The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input device 250 may receive a command or data to be used by other component (e.g., the processor 220) of the electronic device 201, from the outside (e.g., a user) of the electronic device 201. The input device 250 may include, for example, a microphone, a mouse, or a keyboard.

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment, the audio module 270 may obtain the sound via the input device 250, or output the sound via the sound output device 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector), The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. According to an embodiment, the antenna module 297 may include one or more antennas, and, therefrom, at least one antenna appropriate for a communication scheme used in the communication network, such as the first network 298 or the second network 299, may be selected, for example, by the communication module 290 (e.g., the wireless communication module 292). The signal or the power may then be transmitted or received between the communication module 290 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 and 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

According to an embodiment, an electronic device 201 may be the electronic device 100 of FIG. 1, a server 208 may be the first server 120 and/or the second server 130 of FIG. 1, and a network 299 may be the network 110 of FIG. 1. According to an embodiment, the network 299 may include a packet switched network and a circuit switched network. For example, the electronic device 201 may communicate with the server 208 via the packet switched network and/or the circuit switched network.

Figure 3:
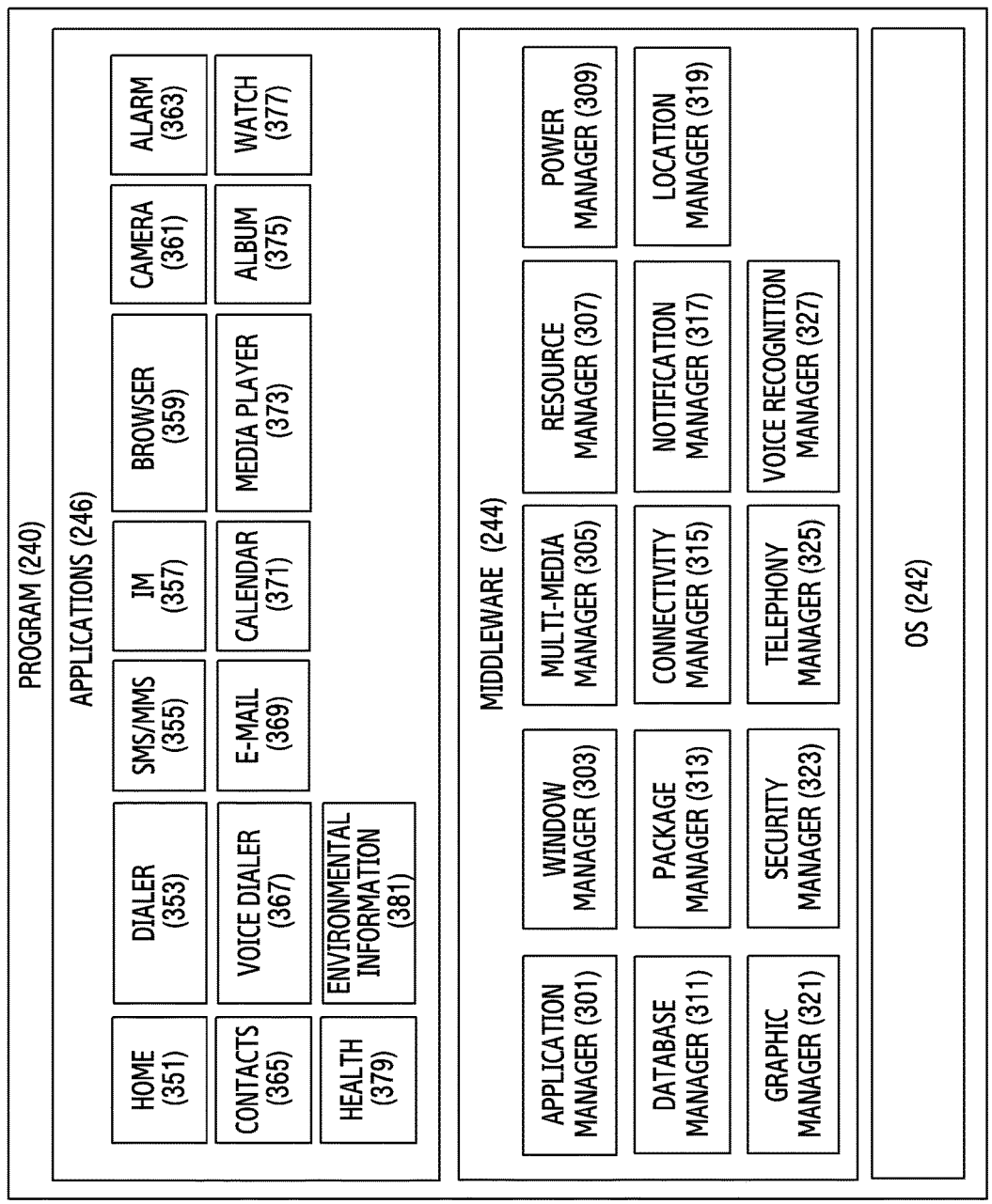
FIG. 3 is a block diagram of a program according to various embodiments of the disclosure.

FIG. 3 is a block diagram 300 illustrating the program 240 according to various embodiments. According to an embodiment, the program 240 may include an operating system (OS) 242 to control one or more resources of the electronic device 201, middleware 244, or an application 246 executable in the OS 242. The OS 242 may include, for example, Android™, iOS™, Windows™, Symbian™, Tizen™, or Bada™. At least part of the program 240, for example, may be pre-loaded on the electronic device 201 during manufacture, or may be downloaded from or updated by an external electronic device (e.g., the electronic device 202 or 204, or the server 208) during use by a user.

The OS 242 may control management (e.g., allocating or deallocation) of one or more system resources (e.g., process, memory, or power source) of the electronic device 201. The OS 242, additionally or alternatively, may include one or more driver programs to drive other hardware devices of the electronic device 201, for example, the input device 250, the sound output device 255, the display device 260, the audio module 270, the sensor module 276, the interface 277, the haptic module 279, the camera module 280, the power management module 288, the battery 289, the communication module 290, the subscriber identification module 296, or the antenna module 297.

The middleware 244 may provide various functions to the application 246 such that a function or information provided from one or more resources of the electronic device 201 may be used by the application 246. The middleware 244 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327. The application manager 301, for example, may manage the life cycle of the application 246. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 246 or a memory space of the memory 230. The power manager 309, for example, may manage the capacity, temperature, or power of the battery 289, and determine or provide related information to be used for the operation of the electronic device 201 based at least in part on corresponding information of the capacity, temperature, or power of the battery 289. According to an embodiment, the power manager 309 may interwork with a basic input/output system (BIOS) (not shown) of the electronic device 201.

The database manager 311, for example, may generate, search, or change a database to be used by the application 246. The package manager 313, for example, may manage installation or update of an application that is distributed in the form of a package file. The connectivity manager 315, for example, may manage a wireless connection or a direct connection between the electronic device 201 and the external electronic device. The notification manager 317, for example, may provide a function to notify a user of an occurrence of a specified event (e.g., an incoming call, message, or alert). The location manager 319, for example, may manage locational information on the electronic device 201. The graphic manager 321, for example, may manage one or more graphic effects to be offered to a user or a user interface related to the one or more graphic effects. The security manager 323, for example, may provide system security or user authentication. The telephony manager 325, for example, may manage a voice call function or a video call function provided by the electronic device 201. The voice recognition manager 327, for example, may transmit a user's voice data to the server 208, and receive, from the server 208, a command corresponding to a function to be executed on the electronic device 201 based at least in part on the voice data, or text data converted based at least in part on the voice data. According to an embodiment, the middleware 344 may dynamically delete some existing components or add new components. According to an embodiment, at least part of the middleware 244 may be included as part of the OS 242 or may be implemented as another software separate from the OS 242.

The application 246 may include, for example, a home 351, dialer 353, short message service (SMS)/multimedia messaging service (MMS) 355, instant message (IM) 357, browser 359, camera 361, alarm 363, contact 365, voice recognition 367, email 369, calendar 371, media player 373, album 375, watch 377, health 379 (e.g., for measuring the degree of workout or biometric information, such as blood sugar), or environmental information 381 (e.g., for measuring air pressure, humidity, or temperature information) application. According to an embodiment, the application 246 may further include an information exchanging application (not shown) that is capable of supporting information exchange between the electronic device 201 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 201 to the external electronic device. Additionally or alternatively, the notification relay application may receive notification information from the external electronic device and provide the notification information to a user of the electronic device 201. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
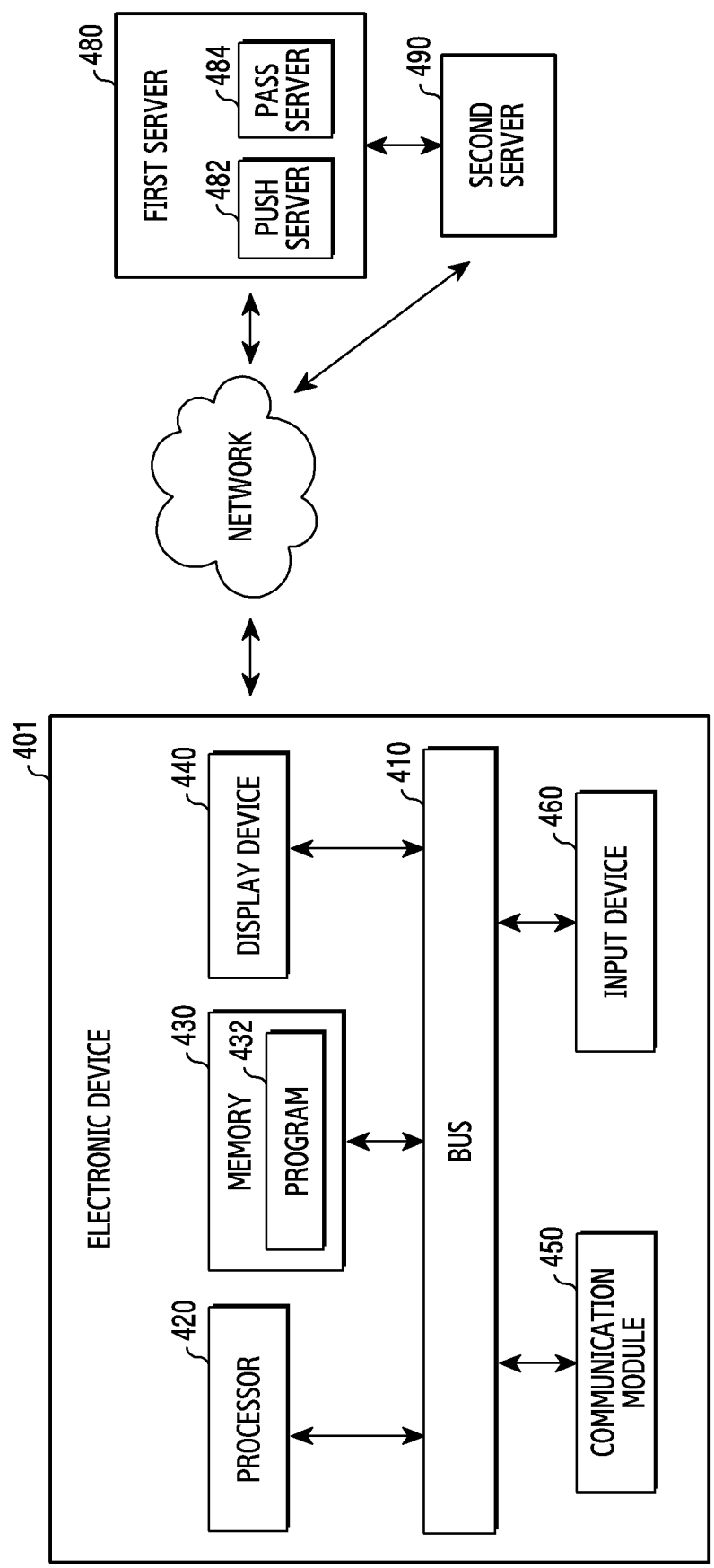
FIG. 4 is a block diagram of an electronic device according to various embodiments of the disclosure.

FIG. 4 is a block diagram of an electronic device according to various embodiments of the disclosure. The electronic device 401 of FIG. 4 may be the electronic device 100 illustrated in FIG. 1 and/or the electronic device 201 illustrated in FIG. 2.

Referring to FIG. 4, an electronic device 401 may include a bus 410, a processor 420, a memory 430, a display device 440, and a communication module 450, and an input device 470. In some embodiments, the electronic device 401 may omit at least one of elements, or may further include another element.

According to various embodiments, the bus 410 may include, for example, a circuit which mutually connects elements (420 to 470) and transfers communication (e.g., a control message and/or data) between the elements.

According to various embodiments, the processor 420 (e.g., the processor 220 of FIG. 2) may control at least one other element of the electronic device 401, which is connected to the processor 420, by executing software (e.g., a program 432) included in the memory 430.

According to various embodiments, the processor 420 may perform a service registration procedure related to a push notification. According to an embodiment, the processor 420 may control the communication module 450 (e.g., the communication module 290 of FIG. 2) to transmit, to a first server 480 (e.g., the first server of FIG. 1), a push notification service registration request signal including identification information of the electronic device 401. The identification information of the electronic device may include at least one of a phone number, international mobile equipment identity (IMEI), a serial number, or caller identification information (e.g., a sender ID). According to an embodiment, the push notification service registration request signal may further include identification information of a non-SMS application program. For example, identification information of the non-SMS application program may include at least one of an ID of the non-SMS application program or key information of a non-SMS application. The non-SMS application program may be an application program for processing a message received from the first server 480. According to an embodiment, the service registration procedure may be performed on the basis of occurrence of a preconfigured event. For example, the processor 420 may control the communication module 450 to transmit, to the first server 480, the push notification service registration request signal in response to detection of at least one event among an initial booting event of the electronic device, an initial execution event of a first application program, an initial execution event of a second application program, or a user input sensing event requesting service registration. The first application program may be an SMS application program, and the second application program may be a non-SMS application program. According to an embodiment, the processor 420 may perform control so that a user interface including an indication that a service registration procedure related to the push notification is displayed on the display device 440 (e.g., the display device 260 of FIG. 2). According to an embodiment, the processor 420 may omit display of the indication indicating that the service registration procedure related to the push notification is performed. For example, if the initial execution event of the first application program is detected, the processor 420 may perform control so that the user interface related to execution of the first application program is displayed on the display device 440, while performing the service registration procedure related to the push notification. According to an embodiment, the processor 420 may control the communication module 450 to transmit a service registration request signal including pre-acquired caller identification information (e.g., a sender ID) to a push server 482 (e.g., the push server 122 of FIG. 1) of the first server 480. The processor 420 may receive a signal including a registration token from the push server 482 via the communication module 450 in response to the service registration request signal. The registration token may be authentication information for the second application program. The processor 420 may control the communication module 450 to transmit a signal including the received registration token to a pass server 484 of the first server 480 (e.g., the pass server 124 of FIG. 1). According to an embodiment, a signal transmitted to the push server 482 or the pass server 484 of the first server 480 may include a phone number of the electronic device 201. According to an embodiment, caller identification information included in the service registration request signal may be information acquired from the push server 482 of the first server 480 in a development stage. For example, a developer of the electronic device 401 may receive at least one of caller identification information for the electronic device 401 or server key information from the push server 482 of the first server 480 in the development stage of the electronic device 401. The caller identification information may be identification information of the electronic device 401, which is used to identify the electronic device 401 by the push server 482 and/or the pass server 484 of the first server 480, and may be information used by the pass server 484 of the first server 480 to access the push server 482 of the first server 480. The developer of the electronic device 401 may register the received server key information in the pass server 484 of the first server 480, and may store the received caller identification information as identification information of the electronic device 401 in the memory 450 (e.g., the memory 230 of FIG. 2). According to an embodiment, when an event for performing the service registration procedure is detected, the processor 420 may determine whether to perform the service registration procedure, on the basis of whether the registration token received from the push server 482 is present in the memory 430. For example, if the registration token received from the push server 482 is not present in the memory 430, the processor 420 may determine that the service registration procedure has not been performed and may determine to perform the service registration procedure. As another example, if the registration token received from the push server 482 is present in the memory 430, the processor 420 may determine that the service registration procedure is previously performed and may determine not to perform the service registration procedure.

According to various embodiments, the processor 420 may receive, from the first server 480, a push notification and a non-SMS format message related to the push notification via the communication module 450 by using the second application program. According to an embodiment, the processor 420 may receive a push notification from the first server 480 via the communication module 450 by using the second application program. According to an embodiment, the push notification message may indicate that a message for the first application program is present in the first server 480. For example, the push notification message may include identification information (e.g., ID) of the message for the first application program, which is stored in the first server 480. The processor 420 may control the communication module 450 to transmit, to the first server 480, a signal for requesting to transmit a non-SMS format message related to the push notification, by using the second application program. For example, the processor 420 may acquire message identification information from the push notification message by using the second application program, and may control the communication module 450 to transmit the message request signal including the message identification information to the first server 480. According to an embodiment, the processor 420 may receive a message corresponding to the message identification information from the first server 480 by using the second application program. The received message may be a non-SMS format message. According to an embodiment, the non-SMS format message may be a message including at least a part of data conforming to the known SMS standard. For example, the non-SMS format message may include, at least in part in the message, TPDU data conforming to 3GPP or 3GPP2 SMS standard specifications.

According to various embodiments, the processor 420 may perform an integrity check for the received non-SMS format message, and may control the communication module 450 to transmit, to the first server 480, a response signal according to the integrity check. For example, the processor 420 may exchange a certificate and data session key with the first server 480, and may perform an integrity check for the message received from the first server 480 so as to determine whether integrity is secured, on the basis of the exchanged certificate and data session key. According to an embodiment, if it is determined that the integrity for the received message is not secured, the processor 420 may control the communication module 450 to transmit an NACK response signal to the first server 480. According to an embodiment, if it is determined that the integrity for the received message is secured, the processor 420 may control the communication module 450 to transmit an ACK response signal to the first server 480.

According to various embodiments, the processor 420 may provide the message received using the second application program to the first application program. For example, if it is determined that the integrity for the received message is secured, the processor 420 may provide the message received using the second application program to the first application program. According to an embodiment, the processor 420 may change a format of the received message by using the second application program, and then may provide the message, the format of which has been changed, to the first application program. For example, the processor 420 may change the received non-SMS format message to an SMS format message which may be processed by the first application program. In various embodiments of the disclosure, an SMS may be used to refer to an LMS. For example, an SMS format may refer to at least one of the SMS format and an LMS format. As another example, an SMS message may refer to at least one of the SMS message or an LMS message.

According to various embodiments, the processor 420 may process the received message by using the first application program. According to an embodiment, the processor 420 may control the display device 440 so that the message, the format of which has been changed, is displayed using the user interface of the first application program. According to an embodiment, the processor 420 may store the received message, the format of which has been changed, by using the first application program. For example, the processor 420 may perform control so that the received message is stored in an SMS message reception box, by using the first application program. According to an embodiment, the processor 420 may process an error related to the received message, by using the first application program. For example, the processor 420 may determine whether an error occurs, on the basis of at least one of whether it is possible to store the received message, whether the received message is received in duplicate, or whether it is possible to perform data format processing for the received message. When it is determined that an error has occurred, the processor 420 may generate a code indicating a cause of an error by using the first application program. For example, the processor 420 may determine whether it is possible to store the received message, on the basis of a remaining memory capacity and a size of the received message. If the remaining memory capacity is smaller than the size of the received message, the processor 420 may generate a first cause code indicating that the received message cannot be stored due to a memory capacity. As another example, the processor 420 may determine whether the received message is received in duplicate, and if the message is received in duplicate, the processor 420 may generate a second cause code indicating that the received message has been received in duplicate. As still another example, the processor 420 may determine whether a format of data included in the received message is a data format which can be processed by the first application program, and if the format of the data included in the received message is not a data format which can be processed by the first application program, the processor 420 may generate a third cause code indicating a data format error of the received message. According to an embodiment, the processor 420 may perform an operation corresponding to a code indicating a cause of an error, by using the second application program. For example, if the code indicating the cause of the error is the first cause code, the processor 420 may perform control so that an alert message for the memory capacity is displayed on the display device 440, by using the second application program. For example, the processor 420 may request a user to secure the memory capacity, by controlling the alert message for the memory capacity to be displayed on the display device 440. The processor 420 may detect that the memory capacity is secured by a user input, and may retransmit the received message to the first application program by using the second application program. As another example, when the code indicating the cause of the error is the second cause code, the processor 420 may determine that the received message is a message which has already been processed by the first application program, and may perform control so that an operation for processing the received message is terminated. For example, the processor 420 may terminate the operation for processing the received message by discarding the received message. As another example, if the code indicating the cause of the error is the third cause code, the processor 420 may transmit a signal indicating a message processing failure to the first server 480 by using the second application program. A message indicating the message processing failure may include information for requesting of transmitting a corresponding message via the circuit switched network. According to an embodiment, if normal processing for the received message is not detected within a threshold time, or if the code indicating the cause of the error is not generated, the processor 420 may repeatedly perform the operation of providing the received message to the first application program by using the second application program.

According to various embodiments, while displaying the received message by using the user interface of the first application program the processor 420, the processor 420 may determine whether a user input for configuring whether to allow reception of the received message via the push notification is detected. According to an embodiment, the processor 420 may determine whether to allow reception, on the basis of a uniform resource locator (URL) included in the received message, and may control the communication module 450 to transmit, to the first server 480, a signal indicating the determined whether to allow reception. For example, the received message displayed on the display device 440 via the user interface of the first application program may include at least one of a URL for allowing reception and a URL for rejecting reception. If a user input for the URL for allowing reception is detected, the processor 420 may control the communication module 450 to transmit, to the first server 480, a signal indicating allowing of reception, while accessing the URL. If a user input for the URL for rejecting reception is detected, the processor 420 may control the communication module 450 to transmit, to the first server 480, a signal indicating rejection of reception, while accessing the URL. As another example, the received message displayed on the display device 440 via the user interface of the first application program may include a first area for configuration of allowing reception and a second area for configuration of rejecting reception. If a user input for the first area for configuration of allowing reception is detected, the processor 420 may control the communication module 450 to transmit the signal indicating allowing of reception to the first server 480, and if a user input for the second area for configuration of rejection of reception is detected, the processor 420 may control the communication module 450 to transmit the signal indicating rejection of reception to the first server 480. According to an embodiment, the signal indicating whether to allow reception may include at least one of identification information (e.g., a phone number) of the electronic device 401 or caller information of the received message. The caller information of the received message may be acquired from the received message by using the second application. The caller information of the received message may include, for example, identification information (e.g., a service provider's phone number or a service provider's name) of a second server 490 (e.g., the second server 130 of FIG. 1) having transmitted the received message.

According to various embodiments, the processor 420 may receive an SMS format message from the second server 490 via the communication module 450 by using the first application program. For example, if the electronic device 401 does not subscribe to a push notification related service, the processor 420 may receive an SMS format message from the second server 490 via the communication module 450 by using the first application program. As another example, if processing of a non-SMS format message received using the second application program has failed, the processor 420 may receive an SMS format message from the second server 490 via the communication module 450 by using the first application program. According to an embodiment, the processor 420 may process the SMS format message received using the first application program. According to an embodiment, the processor 420 may control the display device 440 so that the received message is displayed using the user interface of the first application program. According to an embodiment, the processor 420 may store the received message by using the first application program. For example, the processor 420 may perform control so that the received message is stored in an SMS message reception box, by using the first application program.

According to various embodiments, the memory 430 may store software (e.g., the program 432), and input data and output data for commands relating to the software. According to an embodiment, the memory 430 (e.g., the memory 230 of FIG. 2) may store the first application program that is an SMS application program, and the second application program that is a non-SMS application program. According to an embodiment, the memory 430 may further store other application programs in addition to the first application program and the second application program. According to an embodiment, the memory 430 may store SMS format messages in a memory area related to the first application program. The memory 430 may store non-SMS format messages in a memory area related to the second application program.

According to various embodiments, the display device 440 (e.g., the display device 260 of FIG. 2) may display various user interfaces according to a control of the processor 420. According to an embodiment, the display device 440 may display a user interface of an application (e.g., the first application program) according to a control of the processor 420. A user interface of the first application program may include at least a part of an SMS format message.

According to various embodiments, the communication module 450 (e.g., the communication module 290 of FIG. 2) may communicate with another electronic device, the first server 480, or the second server 490, which is connected wirelessly or through a wire. According to an embodiment, the communication module 450 may receive a push notification and a non-SMS format message (or a non-SMS format message via the push notification) related to the push notification from the first server 480 via a packet switched network. According to an embodiment, the communication module 450 may receive an SMS format message from the second server 490 via a circuit switched network.

According to various embodiments, the input device 460 (e.g., the input device 250 of FIG. 2) may receive data or a control command related to whether to allow message reception and/or message display, from the outside (e.g., a user) of the electronic device 401.

Figure 5:
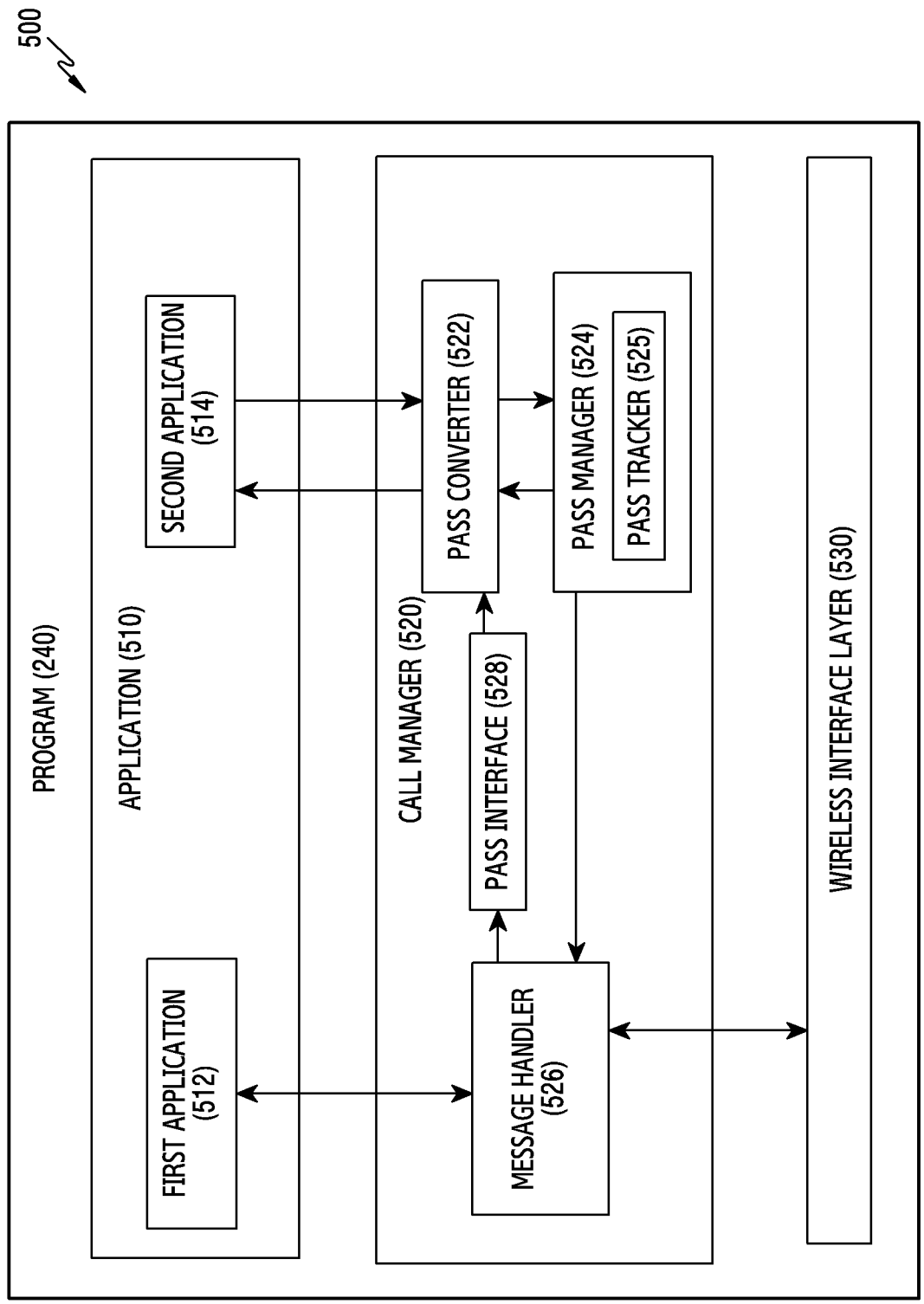
FIG. 5 is a block diagram of a program according to various embodiments of the disclosure.
Figure 6A:
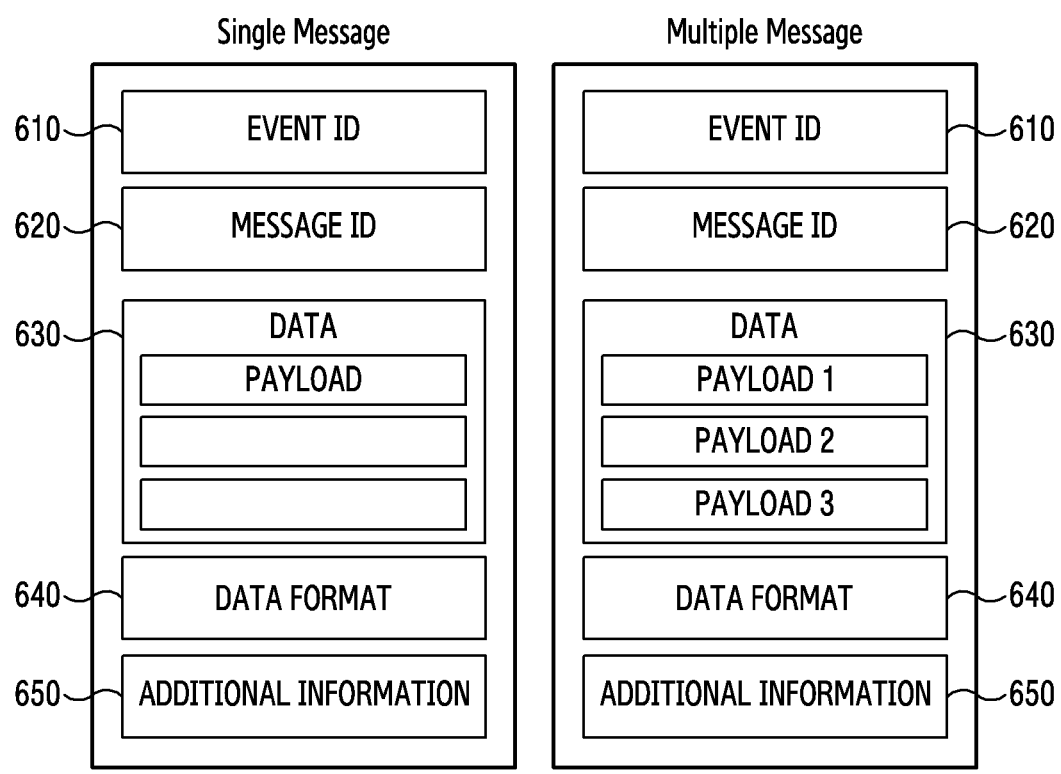
FIG. 6A and FIG. 6B illustrate message formats according to various embodiments of the disclosure.
Figure 6B:
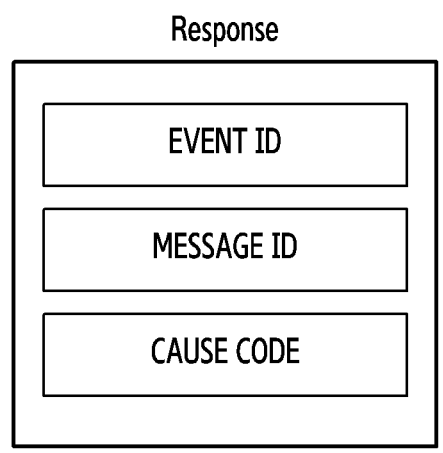

FIG. 5 is a block diagram 500 of a program 240 according to various embodiments of the disclosure. The program 240 of FIG. 5 may be the program 240 illustrated in FIG. 2. According to an embodiment, the program 240 may include an application 510, a call manager 520, and a wireless interface layer 530. Hereinafter, the program 240 of FIG. 5 will be described with reference to FIG. 6A and FIG. 6B. FIG. 6A and FIG. 6B illustrate data formats of messages according to various embodiments of the disclosure. Hereinafter, a first server may be the first server 120 of FIG. 1 and/or the first server 480 of FIG. 4, and a second server may be the second server 130 of FIG. 1 and/or the second server 490 of FIG. 4.

According to various embodiments, an application 510 (e.g., the application 246 of FIG. 2 or the application 246 of FIG. 3) may include a first application 512 and a second application 514. According to an embodiment, the first application 512 may be an application program that processes an SMS message, and the second application 514 may be an application program that processes a non-SMS message. According to an embodiment, the second application 514 may be a push application program or a non-message application program. The push application program may be an application program that receives a push notification message from the first server (e.g., the first server 120 of FIG. 1 or the first server 480 of FIG. 4) and reads the push notification message.

According to various embodiments, the first application 512 may include instructions configured to receive an SMS message from a message handler 526 of a call manager 520, and process and manage the received message.

According to various embodiments, the second application 514 may include instructions configured to receive a non-SMS format message from the first server via a packet switched network. For example, the second application 514 may include instructions configured to receive a push notification message via an Internet protocol (IP) interface. The second application 514 may include instructions configured to transmit, to the first server, a signal for requesting message transmission, on the basis of message identification information included in the push notification message. The second application 514 may include instructions configured to receive a non-SMS format message from the first server. The non-SMS format message received from the first server may include at least one piece of transport protocol data unit (TPDU) data. According to an embodiment, the non-SMS message may be configured in the form in which multiple pieces of TPDU data are arranged. According to an embodiment, the second application 514 may include instructions configured to analyze the received non-SMS message so as to check type information of data included in the non-SMS message. For example, the second application 514 may determine whether the TPDU included in the non-SMS message is data of a first type corresponding to the known SMS standard, on the basis of the type information of the TPDU data included in the received non-SMS message. If the determined type information corresponds to the first type, the second application 514 may include instructions for transmission of the received non-SMS format message to a pass converter 522 of the call manager 520. For example, the second application 514 may include instructions for acquisition of at least one piece of TPDU data from the non-SMS format message, and for transmission of the acquired TPDU data to the pass converter 522. As another example, if the determined type information does not correspond to the preconfigured first type, the second application 514 may include instructions configured to process the non-SMS format message on the basis of a determined type. For example, if the determined type information does not correspond to the first type, the second application 514 may include instructions configured to process the received non-SMS format message by the second application 514 without transmitting the same to the pass converter 522. According to an embodiment, the second application 514 may include instructions configured to, when a code indicating a cause of an error for the non-SMS format message is received from the pass converter 522, perform an operation corresponding to the code indicating the cause of the error. For example, the second application 514 may include instructions configured to, on the basis of the code indicating the cause of the error, retransmit at least one piece of TPDU data included in the non-SMS message to the pass converter 522, discard the non-SMS message, or transmit a signal indicating a processing failure for the non-SMS format message to the first server. According to an embodiment, the second application may include instructions for providing of an intent including at least one piece of TPDU data to the pass converter 522.

According to various embodiments, the call manager 520 (e.g., the call manager 325 of FIG. 3) may include the pass converter 522, a pass manager 524, the message handler 526, and a pass interface 528. According to an embodiment, the pass converter 522, the pass manager 524, and the pass interface 518 may be configured by one program module. According to an embodiment, the call manager 520 may be referred to as a telephony framework. According to an embodiment, at least one of the pass converter 522, the pass manager 524, the message handler 526, and the pass interface 528 may not be included in the call manager 520. According to an embodiment, the call manager 520 may be included in a middle ware (e.g., the middle ware 244 of FIG. 2 or the middle ware 244 of FIG. 3) layer.

According to various embodiments, the pass converter 522 may include instructions configured to convert a non-SMS format message to an SMS format message. According to an embodiment, the pass converter 522 may include instructions configured to convert at least one piece of TPDU data received from the second application 514 into an SMS format message. For example, as illustrated in FIG. 6A, the pass converter 522 may perform conversion into an SMS format corresponding to a multi-message or an SMS format corresponding to a single message including TPDU data. The message converted into the SMS format may include at least one of an event ID field 610, a message ID field 620, a data field 630, a format field 640, or an additional information field 650. The event ID field 610 may include information indicating an event type of a corresponding message. For example, the event ID field 610 may indicate whether the message is a received message or a response message. For example, if the message is received from the first server, the event ID field 610 may include a value of 0x01, and if the message is a response message to be transmitted from the electronic device 401 to the first server, the event ID field 610 may include a value of 0x03. The message ID field 620 may include message identification information related to TPDU data. For example, the message ID field 620 may include message identification information received from the first server. The message identification information may be acquired from a push notification message or an SMS format message. The data field 630 may include at least one piece of TPDU data received from the second application 514. For example, the data field 630 may include one payload field corresponding to one piece of TPDU data, such as an SMS format corresponding to a single message, or may include a plurality of payload fields corresponding to multiple respective pieces of TPDU data, such as an SMS format corresponding to a multi-message. The data format field 640 may include information indicating a data format of a payload field included in the data field 630. For example, the data format field 640 may include information indicating that the payload included in the data field 630 is data corresponding to 3GPP or 3GPP2 standard specifications. Information included in the data format field 640 may be acquired from a non-SMS format message received from the first server, or may be acquired by analyzing TPDU data in the pass converter 522. The additional information field 650 is a field added for expansion, and may include, for example, additional information related to a secure text, etc. According to an embodiment, the pass converter 522 may include instructions configured to, if a code indicating a cause of an error is received from the pass interface 522, request identification information of a message related to error occurrence from the pass manager 524, and generate a response message on the basis of a cause code and the message identification information. For example, the pass converter 522 may generate a response message as illustrated in FIG. 6B. The response message may include at least one of the event ID field 610, a message ID field 620, or a cause code field 660. The event ID field 610 may include information indicating an event type of a corresponding message. For example, the event ID field 610 may indicate whether the message is a received message or a response message. For example, if the message is received from the first server, the event ID field 640 may include a value of 0x01, and if the message is a response message to be transmitted from the electronic device 401 to the first server, the event ID field 640 may include a value of 0x03. The message ID field 620 may include message identification information related to TPDU data. The message ID field 620 may include message identification information assigned by the first server, and the message identification information may be received from the pass manager 524. The message ID field 620 may include a cause code indicating a cause of an error for message processing. The cause code may be received from the message handler 526 via the pass interface 528. The cause code may be one of a first cause code indicating insufficient memory and/or a retry, a second cause code indicating duplicate reception and/or disregard, and a third cause code indicating that transmission via a circuit switched network and/or a data format error are required. According to an embodiment, the pass converter 522 may include instructions configured to provide a message converted into an SMS format to the pass manager 524, and provide a generated response message to the second application 514.

According to various embodiments, the pass manager 524 may include instructions configured to receive an SMS format message from the pass converter 522 and store and manage the received SMS format message. According to an embodiment, the pass manager 524 may include the pass tracker 525 to store the received SMS format message. For example, the pass tracker 525 may include at least one of event ID information, message ID information, payload format information, or additional information which are included in the received SMS format message. The pass manager 524 may include instructions configured to transfer the received SMS format message to the message handler 526. According to an embodiment, the pass manager 524 may include instructions configured to provide the pass converter 522 with message identification information for generation of a response message.

According to various embodiments, the message handler 526 may include instructions for processing of an SMS message (or an SMS format message). The message handler 526 may include instructions configured to receive an SMS message from the pass manager 524 or the wireless interface layer 530, and provide the received SMS message to the first application program 512. According to an embodiment, the message handler 526 may include instructions configured to, if an SMS format message is received from the pass manager 524, add a flag, which indicates reception from the pass manager 524, to the SMS format message. According to an embodiment, the message handler 526 may include instructions configured to determine whether an error occurs, on the basis of at least one of whether it is possible to store the received SMS message, whether the received SMS message is received in duplicate, or whether it is possible to perform data format processing for the received SMS message. For example, the message handler 526 may include instructions for determination on whether it is possible to store the received SMS message, on the basis of a remaining available memory capacity and a size of the received SMS message. The message handler 526 may include instructions for, if the remaining available memory capacity is equal to or greater than the size of the received SMS message, transferring of the received SMS message to the first application 512. The message handler 526 may include instructions configured to, if the remaining available memory capacity is equal to or smaller than the size of the received SMS message, generate a cause code indicating a lack of the memory capacity. As another example, the message handler 526 may include instructions configured to determine whether the received SMS message is received in duplicate. The message handler 526 may include instructions for, if it is determined that the received SMS message is not received in duplicate, transferring of the received SMS message to the first application 512. The message handler 526 may include instructions configured to, if it is determined that the received SMS message is received in duplicate, generate a cause code indicating that the received message is received in duplicate. As another example, the message handler 526 may include instructions configured to determine whether a data format of the received SMS message can be processed by the first application program. The message handler 526 may include instructions for, if the data format of the received SMS message can be processed by the first application program, transferring of the received SMS message to the first application 512. The message handler 526 may include instructions configured to, if the data format of the received SMS message cannot be processed by the first application program, generate a cause code indicating a data format error of the received SMS message.

According to an embodiment, the message handler 526 may include instructions configured to provide a cause code indicating an error related to the received SMS message to the wireless interface layer 530 or the pass interface 528. According to an embodiment, the message handler 526 may include instructions configured to provide the cause code to one of the wireless interface layer 530 or the pass interface 528, on the basis of whether a flag indicating reception from the pass manager 524 is included in the SMS message related to the cause code. For example, if the flag indicating reception from the pass manager 524 is included in the received SMS message related to the cause code, the message handler 526 may include instructions configured to determine that the SMS message related to the cause code has been received from the pass manager 524 and provide the cause code to the pass interface 528. As another example, if the flag indicating reception from the pass manager 524 is not included in the received SMS message related to the cause code, the message handler 526 may include instructions configured to determine that the SMS message related to the cause code has been received from the wireless interface layer 530 and provide the cause code to the wireless interface layer 530.

According to various embodiments, the pass interface 528 may include instructions configured to transfer a signal or data provided from the message handler 526, to the pass manager 524 and/or the pass converter 522. For example, the pass interface 528 may include instructions configured to transfer a cause code provided from the message handler 526, to the pass manager 524 and/or the pass converter 522.

According to various embodiments, the wireless interface layer 530 may include instructions configured to receive an SMS message from a communication module (e.g., the communication module 450 of FIG. 4) and provide the received SMS message to the message handler 526. According to an embodiment, the wireless interface layer 530 may include instructions configured to provide a response message including the cause code provided from the message handler 526, to the communication module (e.g., the communication module 450 of FIG. 4). According to an embodiment, the wireless interface layer 530 may be included in middleware (e.g., the operating system 242 of FIG. 2 or the operating system 242 of FIG. 3).

Figure 7:
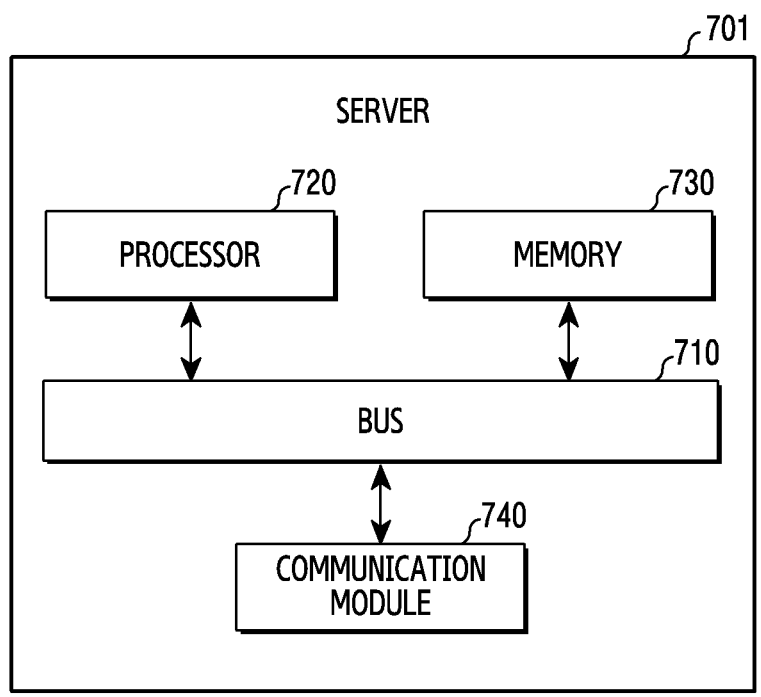
FIG. 7 is a block diagram of a first server according to various embodiments of the disclosure.

FIG. 7 is a block diagram of a first server according to various embodiments of the disclosure. A first server 701 of FIG. 7 may be the first server 120 of FIG. 1, a part of the first server 120, the first server 480 illustrated in FIG. 4, or a part of the first server 480. For example, the first server 701 of FIG. 7 may be the push server 122 and/or the pass server 124 of the first server 120 of FIG. 1, or may be the push server 428 and/or the pass server 484 of the first server 480 of FIG. 4.

Referring to FIG. 7, the first server 701 may include a bus 710, a processor 720, a memory 730, and a communication module 740. In some embodiments, the first server 701 may omit at least one of elements or may additionally include other elements.

According to various embodiments, the bus 710 may include, for example, a circuit which mutually connects elements (720 to 740) and transfers communication (e.g., a control message and/or data) between the elements.

According to various embodiments, the processor 710 may operate software included in the memory 730 so as to control at least one other element of the server 701, which is connected to the processor 720.

According to various embodiments, the processor 720 may perform an operation for providing a push notification service. According to an embodiment, the processor 720 may perform a push notification service registration procedure for at least one electronic device (e.g., the electronic device 401 of FIG. 4) by transmitting a signal to or receiving a signal from the at least one electronic device via the communication module 740. For example, the processor 720 may receive, from at least one electronic device (e.g., the electronic device 401 of FIG. 4), a push notification service registration request signal including identification information of the electronic device via the communication module 740. The processor 720 may update a subscriber list indicating electronic devices registered in the push notification service, on the basis of the received push notification service registration request signal. For example, the processor 720 may acquire identification information of the electronic device from the received push notification service registration signal, and may add the acquired identification information of the electronic device to the subscriber list. The identification information of the electronic device may include at least one of a phone number, international mobile equipment identity (IMEI), a serial number, or caller identification information (e.g., a sender ID). According to an embodiment, the processor 720 may receive caller identification information from at least one electronic device (e.g., the electronic device 401 of FIG. 4) during the push notification service registration procedure of the electronic device, and may assign a registration token to the electronic device in response to reception of the caller identification information. The processor 720 may receive the registration token from the electronic device to which the registration token has been assigned. The caller identification information may be identification information assigned to the electronic device by the processor 720 of the first server 701 in a development state of the electronic device. For example, the processor 720 of the first server 701 may be requested to assign a server key and caller identification information in the development stage of the electronic device, and may transmit the server key and caller identification information to the electronic device in response thereto.

According to various embodiments, the processor 720 may control the communication module 740 to receive a non-SMS format message from a second server (e.g., the second server 130 of FIG. 1 or the second server 490 of FIG. 1), and may transmit the received non-SMS format message to at least one electronic device (e.g., the electronic device 401 of FIG. 4) by using the push notification service. A non-SMS format may be, for example, a transport protocol data unit format. According to an embodiment, the non-SMS format message may be a message including at least a part of first type data. For example, the non-SMS format message may include, at least in part in the message, TPDU data conforming to 3GPP or 3GPP2 SMS standard specifications. According to an embodiment, the processor 720 may assign message identification information (e.g., a message ID) to the non-SMS format message, and may store, in the memory 730, the non-SMS format message to which the message identification information is assigned. According to an embodiment, the processor 720 may determine at least one electronic device, to which the non-SMS format message is to be transmitted, on the basis of at least one of a receiver list, a subscriber list, or a rejection list with respect to the non-SMS format message. For example, the processor 720 may determine at least one electronic device, to which the non-SMS format message is to be transmitted, on the basis of whether a phone number included in the receiver list for the non-SMS format message is included in the subscriber list and/or the rejection list. According to an embodiment, if at least one first phone number which is included in the receiver list but is not included in the subscriber list exists, the processor 720 may determine that a non-SMS format message cannot be transmitted to an electronic device corresponding to the at least one first phone number. The processor 720 may notify that the electronic device corresponding to the at least one first phone number is not registered in the push notification service, by transmitting a non-registration signal including the at least one first phone number to the second server 130 via the communication module 740. According to an embodiment, if at least one second phone number which is included in the receiver list and the rejection list exists, the processor 720 may determine that a non-SMS format message cannot be transmitted to an electronic device corresponding to the at least one second phone number. The processor 720 may notify that the electronic device corresponding to the at least one second phone number has rejected reception of the non-SMS format message, by transmitting a reception rejecting signal including the at least one second phone number to the second server 130 via the communication module 740. According to an embodiment, the processor 720 may determine electronic devices corresponding to third phone numbers which are included in both of the receiver list and the subscriber list but are not included in the rejection list, as electronic devices to which non-SMS format message transmission is possible. The processor 720 may transmit push notification messages including message identification information to electronic devices corresponding to the at least one third phone number via the communication module 740. According to an embodiment, the processor 720 may receive a message request signal including message identification information from at least one electronic device via the communication module 740, and may retrieve a non-SMS format message corresponding to the message identification information from the memory 730. The processor 720 may control the communication module 740 to transmit the non-SMS format message retrieved from the memory 730 to at least one electronic device having transmitted the message request signal.

According to an embodiment, the processor 720 may receive a signal indicating whether message reception is allowed, from at least one electronic device via the communication module 740. The processor 720 may generate and/or update the rejection list indicating electronic devices having rejected reception of the message, on the basis of the signal indicating whether message reception is allowed. The rejection list may be configured for each caller (e.g., a service provider). For example, the processor 720 may acquire at least one of information indicating rejection of reception, identification information of a corresponding electronic device, or caller information of a message, reception of which is rejected, from the signal indicating whether message reception is allowed, and may generate and/or update the rejection list on the basis of the acquired at least one piece of information.

According to an embodiment, the processor 720 may exchange certificates with a second server (e.g., the second server 130 of FIG. 1) in order to perform an integrity check for a non-SMS format message provided by the second server, and may transmit a certificate of the first server and a certificate of the second server to at least one registered electronic device (e.g., the electronic device 401 of FIG. 1). The processor 720 may control the communication module 740 to perform an operation of exchanging certificates with the second server at a first point of time at which the non-SMS format message is received from the second server or at a point of time before the first point of time. The processor 720 may control the communication module 740 so that a certificate of a server (e.g., the certificate of the first server and/or the certificate of the second server) is transmitted to at least one electronic device at a point of time at which the electronic device is registered. According to an embodiment, the processor 720 may generate a first data session key on the basis of the certificate previously exchanged with the second server, and may exchange the first data session key with the second server via the communication module 740. The processor 720 may receive a non-SMS format message signed with the first data session key from the second server via the communication module 740. When the non-SMS format message is received from the second server, the processor 720 may check integrity of the non-SMS format message by verifying a signature value signed by the second server 720 by means of the first data session key. If the integrity check indicates that integrity is not secured, the processor 720 may transmit an error (e.g., an integrity error) for the received non-SMS format message to the second server. If the integrity check indicates that integrity is secured, the processor 720 may generate a second data session key for an integrity check between the electronic device and the first server 701. The processor 720 may encrypt the first data session key by using the second data session key, and may transmit the encrypted key and the non-SMS format message to the electronic device.

According to an embodiment, the processor 720 may receive a processing failure signal for the non-SMS format message from at least one electronic device. For example, the processor 720 may receive, from at least one electronic device, a signal indicating a message processing failure including information for requesting to transmit the non-SMS format message via a circuit switched network. According to an embodiment, the processor 720 may acquire a phone number of at least one electronic device having failed to process the non-SMS format message, on the basis of the message processing failure signal, and may transmit a message transmission failure signal including the acquired phone number to the second server 130, so as to request transmission of the message via the circuit switched network with respect to the electronic device corresponding to the phone number.

According to various embodiments, the memory 730 may store software and input data and output data for commands related to the software. According to an embodiment, the memory 730 may store at least one of a receiver list or a rejection list. According to an embodiment, the memory 730 may store a non-SMS format message received from the first server 730. The non-SMS format message may be mapped and stored with message identification information.

According to various embodiments, the communication module 740 may transmit signal and/or data to or receive signal and/or data from at least one electronic device over network. The communication module 740 may establish a wireless communication channel between the first server 701 and the electronic device, and may support to perform communication via the established communication channel. According to an embodiment, the communication module 740 may communicate with at least one electronic device via an interface using Internet protocols. For example, the communication module 740 may transmit, using an Internet protocol, at least one of a push notification message, a request signal for a non-SMS format message, or the non-SMS format message to or receive the same from at least one electronic device.

According to various embodiments of the disclosure, an electronic device may include: a display; a wireless communication circuit; a processor operatively connected to the communication circuit and the display; and a memory operatively connected to the processor, wherein the memory stores a first application program that is a short message service (SMS) application program, and a second application program that is a non-SMS application program, and the memory stores instructions causing, when executed, the processor to: receive a push notification from an external server via the communication circuit by using the second application program, wherein the push notification displays a message relating to the first application program; transmit a request for the message to the external server via the communication circuit by using the second application program; receive the message from the external server via the communication circuit by using the second application program; provide the message to the first application program by using the second application program; and display the message by using a user interface of the first application program.

According to various embodiments of the disclosure, the push notification may include identification information for the message.

According to various embodiments of the disclosure, the instructions may cause the processor to receive the message in a first format, and convert the message into a second format which can be processed by the first application program.

According to various embodiments of the disclosure, the instructions may cause the processor to acquire at least one transport protocol data unit from the message in the first format, and generate the message in the second format, which includes the acquired at least one transport protocol data unit.

According to various embodiments of the disclosure, the instructions may cause the processor to: determine whether a type of data included in the message is a data type corresponding to the first application program by using the second application program; if the type of the data is the data type corresponding to the first application type, provide the message to the first application program by using the second application program; and if the type of the data is not the data type corresponding to the first application type, display the message by using a user interface of an application other than the first application. The application other than the first application may include the second application.

According to various embodiments of the disclosure, the instructions may cause the processor to use Internet protocols for reception of the push notification, transmission of the request, and reception of the message.

According to various embodiments of the disclosure, the second application program may be a non-message application program.

According to various embodiments of the disclosure, the instructions may cause the processor to detect error occurrence for the message by using the first application program, and provide a response message including a code indicating a cause of an error to the second application program in response to detection of the error occurrence.

According to various embodiments of the disclosure, the instructions may cause the processor to detect the error occurrence for the message on the basis of at least one of whether it is possible to store the message on the basis of a remaining capacity of the memory, whether the message is received in duplicate, or whether it is possible to process a format of the data included in the message, wherein the code indicating the cause of the error may indicate one of insufficient memory capacity, duplicate reception of the message, or inability to process the format of the data included in the message.

According to various embodiments of the disclosure, the instructions may cause the processor to perform an operation corresponding to the code indicating the cause of the error by using the second application program, wherein the operation corresponding to the code indicating the cause of the error includes at least one of an operation of re-providing the message to the first application program, an operation of discarding the message, or an operation of transmitting a signal indicating a processing failure for the message to the external server.

According to various embodiments of the disclosure, the instructions may cause the processor to detect a user input for configuring whether to allow reception of the message, via the user interface of the first application program, and transmit, to the external server, a signal indicating whether to allow reception of the message, which corresponds to the user input.

According to various embodiments of the disclosure, a server device may include: a network interface; at least one processor operatively connected to the interface; and at least one memory operatively connected to the processor, wherein the memory includes instructions causing, when executed, the processor to: receive first message data in a non-short message service (non-SMS) format from an external server via the interface, wherein the first message data is transmitted to a plurality of mobile devices including phone numbers; transmit a push notification including an indication of the first message data to at least one mobile device corresponding to a part of the mobile devices via the interface using an Internet protocol at least partially on the basis of the phone numbers of the mobile devices; receive a request relating to the first message data from the at least one of the mobile devices via the interface using the Internet protocol; transmit the first message data in the non-SMS format to the at least one of the mobile devices via the interface using the Internet protocol; and provide the external server with information relating to remaining mobile devices, to which the push notification is not transmitted, via the interface at least partially on the basis of phone numbers of the remaining mobile devices.

According to various embodiments of the disclosure, the indication may include identification information for the first message data.

According to various embodiments of the disclosure, the non-SMS format may include a transport protocol data unit.

According to various embodiments of the disclosure, the instructions may cause the processor to determine at least one mobile device corresponding to the part of the mobile devices on the basis of at least one of a list of phone numbers receiving the first message data, a list of subscription phone numbers registered in a system, and a list of phone numbers rejecting to receive a message of the external server.

According to various embodiments of the disclosure, the instructions may cause the processor to receive a signal indicating a processing failure for the first message data from the at least one of the mobile devices via the interface using the Internet protocol, and provide information of the at least one of the mobile devices, which has transmitted the signal indicating the processing failure, to the external server.

Figure 8:
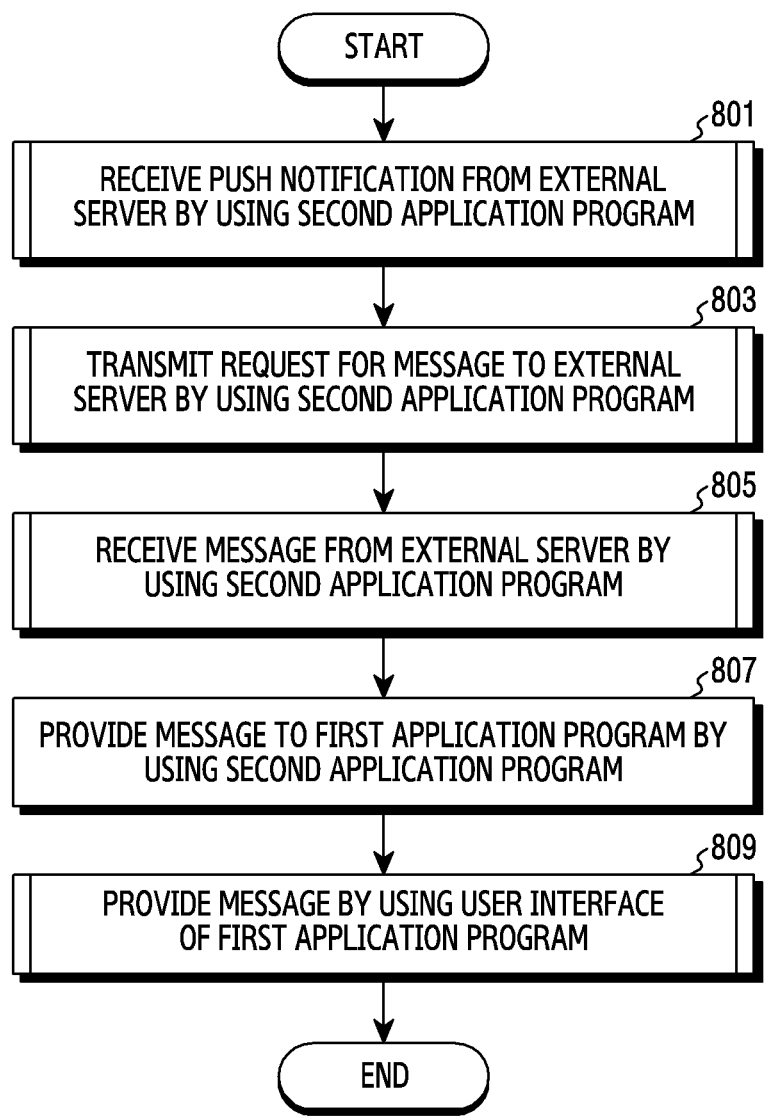
FIG. 8 is a flowchart of receiving a message by using a push notification in an electronic device according to various embodiments of the disclosure.

FIG. 8 is a flowchart of receiving a message by using a push notification in an electronic device according to various embodiments of the disclosure. In the following embodiments, each of operations may be sequentially performed, but is not necessarily performed sequentially. For example, the order of each operation may be changed, and at least two operations may be performed in parallel. Here, an electronic device may be the electronic device 100 of FIG. 1, the electronic device 201 of FIG. 2, and/or the electronic device 401 of FIG. 4. Hereinafter, operations 801 to 809 may be understood as operations performed by the processor 220 of the electronic device 201 of FIG. 2 and/or the processor 420 of the electronic device 401 of FIG. 4. In the following description, a first application program may be the first application program 512 of FIG. 5, which is an SMS application program, and a second application program may be the second application program 514 of FIG. 5, which is a non-SMS application program. In the following description, an external server may be the first server 130 and/or the first server 701.

Referring to FIG. 8, in operation 801, an electronic device may receive a push notification message from an external server by using a second application program. The push notification message may indicate that a message related to the first application program exists in the external server. For example, the push notification message may indicate that the message related to the first application program is stored in the external server, and may include identification information of the message related to the first program, which is stored in the external server. The message related to the first application program may be a non-SMS format message including data conforming to a known SMS standard specification (e.g., 3GPP or 3GPP2 SMS standard specification). For example, the message related to the first application program may be a non-SMS format message including, therein, TPDU data that conforms to a known SMS standard specification (e.g., 3GPP or 3GPP2 SMS standard specification). According to an embodiment, the processor of the electronic device (e.g., the processor 220 of FIG. 2, or the processor 420 of FIG. 4) may receive the push notification message via a communication module (e.g., the communication module 290 of FIG. 2, or the communication module 450 of FIG. 4) by using a packet switched network (e.g., an Internet protocol network).

According to an embodiment, the electronic device 803 may transmit a request for the message to the external server by using the second application program, in operation 803. According to an embodiment, the processor (e.g., the processor 220 or the processor 420) of the electronic device may acquire message identification information included in the push notification message, and may transmit a message request signal including the acquired message identification information to the external server. According to an embodiment, the processor (e.g., the processor 220 or the processor 420) of the electronic device may transmit the request for the message via the communication module (e.g., the communication module 290 or the communication module 450) by using the packet switched network (e.g., the Internet protocol network).

According to an embodiment, the electronic device 805 may receive the message from the external server by using the second application program in operation 805. According to an embodiment, the processor (e.g., the processor 220 or the processor 420) of the electronic device may receive a non-SMS format message from the external server in response to transmission of the request for the message. According to an embodiment, the non-SMS format message received from the external server may include at least one piece of TPDU data. For example, the non-SMS format message may be configured to include one piece of TPDU, or may be configured in a form in which multiple pieces of TPDU data are arranged. According to an embodiment, the processor (e.g., the processor 220 or the processor 420) of the electronic device may receive the non-SMS format message from the external server via the communication module (e.g., the communication module 290 or the communication module 450) by using the packet switched network (e.g., the Internet protocol network).

According to an embodiment, in operation 807, the electronic device may transmit the received message to the first application program by using the second application program. According to an embodiment, the processor (e.g., the processor 220 or the processor 420) of the electronic device may analyze the received message to determine a type of data included in the message, and may provide the received message to the first application program in response to the type being determined as a first type. For example, the processor (e.g., the processor 220 or the processor 420) of the electronic device may determine whether the TPDU included in the non-SMS format message is data of the first type corresponding to the known SMS standard specification, on the basis of type information of the TPDU data included in the received non-SMS format message. If the determined type information corresponds to the preconfigured first type, the processor (e.g., the processor 220 or the processor 420) of the electronic device may provide the received non-SMS format message to the first application program. For example, the processor (e.g., the processor 220 or the processor 420) of the electronic device may acquire at least one piece of TPDU data from the non-SMS format message, and may store the acquired TPDU data to the first application program. According to an embodiment, the processor (e.g., the processor 220 or the processor 420) of the electronic device may change the non-SMS format message to an SMS format message by using the second application program, and may provide the changed SMS format message to the first application program. For example, the processor (e.g., the processor 220 or the processor 420) of the electronic device may acquire the TPDU data from the non-SMS format message by using the second application program, and as illustrated in FIG. 6A, the processor may generate an SMS message in a form in which the TPDU data is included in a payload area, and may provide the generated SMS message to the first application program.

According to an embodiment, the electronic device may provide the message by using a user interface of the first application program, in operation 809. According to an embodiment, the processor (e.g., the processor 220 or the processor 420) of the electronic device may perform control so that the SMS message provided from the second application program is displayed on a display device (e.g., the display device 260 of FIG. 2 or the display device 440 of FIG. 4) via the user interface of the first application program. According to an embodiment, the processor (e.g., the processor 220 or the processor 420) of the electronic device may perform control so that the SMS message provided from the second application program is stored and managed in the first application program. For example, the processor (e.g., the processor 220 or the processor 420) of the electronic device may perform control so that the SMS message provided from the second application program is stored in an SMS message box managed by the first application program. According to an embodiment, the processor (e.g., the processor 220 or the processor 420) of the electronic device may determine whether an error for SMS message processing has occurred, and may perform an operation corresponding to occurrence of the error, by means of the first application program. For example, the processor (e.g., the processor 220 or the processor 420) of the electronic device may determine whether an error occurs, on the basis of whether it is possible to store the SMS message, whether the received SMS message is received in duplicate, or whether data format processing for the SMS message is possible. When an error occurs, the processor (e.g., the processor 220 or the processor 420) of the electronic device may generate a cause code indicating a cause of the error by using the first application program, may provide the cause code indicating occurrence of the error to the second application program, and may control the second application program to perform an operation corresponding to the cause code.

Figure 9:
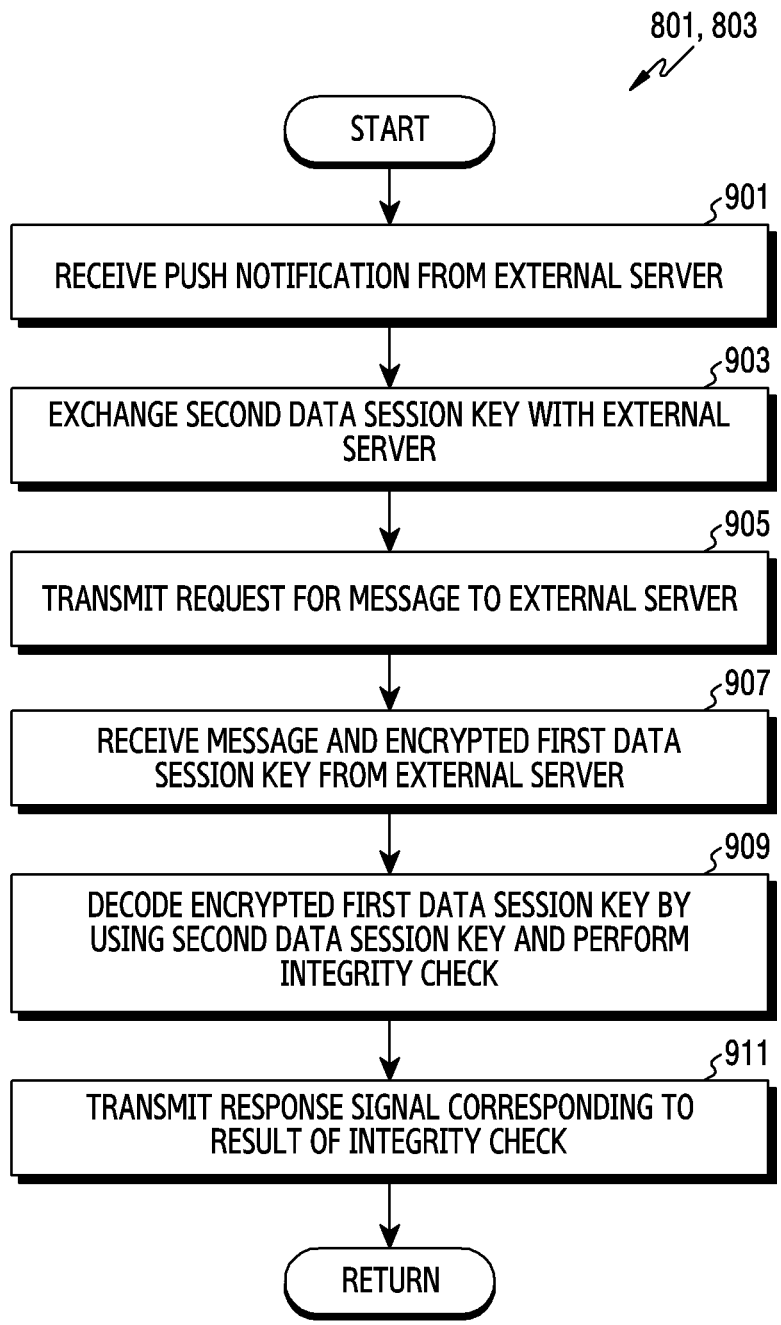
FIG. 9 is a flowchart of checking integrity of a message in an electronic device according to various embodiments of the disclosure.

FIG. 9 is a flowchart of checking integrity of a message in an electronic device according to various embodiments of the disclosure. Hereinafter, operation 801 and operation 803 of FIG. 8 will be described in detail. In the following embodiments, each of operations may be sequentially performed, but is not necessarily performed sequentially. For example, the order of each operation may be changed, and at least two operations may be performed in parallel. Here, an electronic device may be the electronic device 100 of FIG. 1, the electronic device 201 of FIG. 2, and/or the electronic device 401 of FIG. 4. Hereinafter, operations 901 to 911 may be understood as operations performed by the processor 220 of the electronic device 201 of FIG. 2 and/or the processor 420 of the electronic device 401 of FIG. 4. In the following description, an external server may be the first server 130 and/or the first server 701.

Referring to FIG. 9, an electronic device according to an embodiment may receive a push notification message from an external server, in operation 901. According to an embodiment, the processor (e.g., the processor 220 or the processor 420) of the electronic device may receive a push notification message from the external server, as described in operation 801 of FIG. 8.

According to an embodiment, the electronic device may exchange a second data session key with the external server, in operation 903. According to an embodiment, the processor (e.g., the processor 220 of FIG. 2 or the processor 420 of FIG. 4) of the electronic device may access the external server to exchange the second data session key in response to reception of the push notification message from the external server. The second data session key may be generated on the basis of a certificate previously exchanged with the external server. The second data session key may be exchanged with the external server for an integrity check for a non-SMS message related to the push notification message.

According to an embodiment, the electronic device may transmit a request for the message to the external server, in operation 905. According to an embodiment, the processor (e.g., the processor 220 or the processor 420) of the electronic device may receive a push notification message from the external server, as described in operation 803 of FIG. 8.

According to an embodiment, the electronic device may receive a message and an encrypted first data session key from the external server, in operation 907. According to an embodiment, the processor (e.g., the processor 220 or the processor 420) of the electronic device may receive a non-SMS format message and the encrypted first data session key via a communication module (e.g., the communication module 290 of FIG. 2 or the communication module 450 of FIG. 4) by using a packet switched network (e.g., an Internet protocol network). The encrypted first data session key may be a first data session key encrypted with the second data session key in the external server. The first data session key may be a data session key generated on the basis of a certificate exchanged with another external server (e.g., the second server 130) by the external server.

According to an embodiment, the electronic device may decode, using the second data session key, the encrypted first data session key to perform an integrity check, in operation 909. According to an embodiment, the processor (e.g., the processor 220 or the processor 420) of the electronic device may decode the encrypted first data session key with the second data session key to acquire the first data session key. The processor (e.g., the processor 220 or the processor 420) of the electronic device may perform the integrity check for the non-SMS format message received from the external server, by using the acquired first data session key.

According to an embodiment, the electronic device may transmit, to the external server, a response signal corresponding to a result of the integrity check, in operation 911. According to an embodiment, if it is determined that integrity of the received non-SMS format message is secured, the processor (e.g., the processor 220 or the processor 420) of the electronic device may transmit an ACK response signal to the external server via the communication module (e.g., the communication module 290 or the communication module 450). According to an embodiment, if it is determined that integrity of the received non-SMS format message is not secured, the processor (e.g., the processor 220 or the processor 420) of the electronic device may transmit an NACK response signal to the external server via the communication module (e.g., the communication module 290 or the communication module 450).

Figure 10:
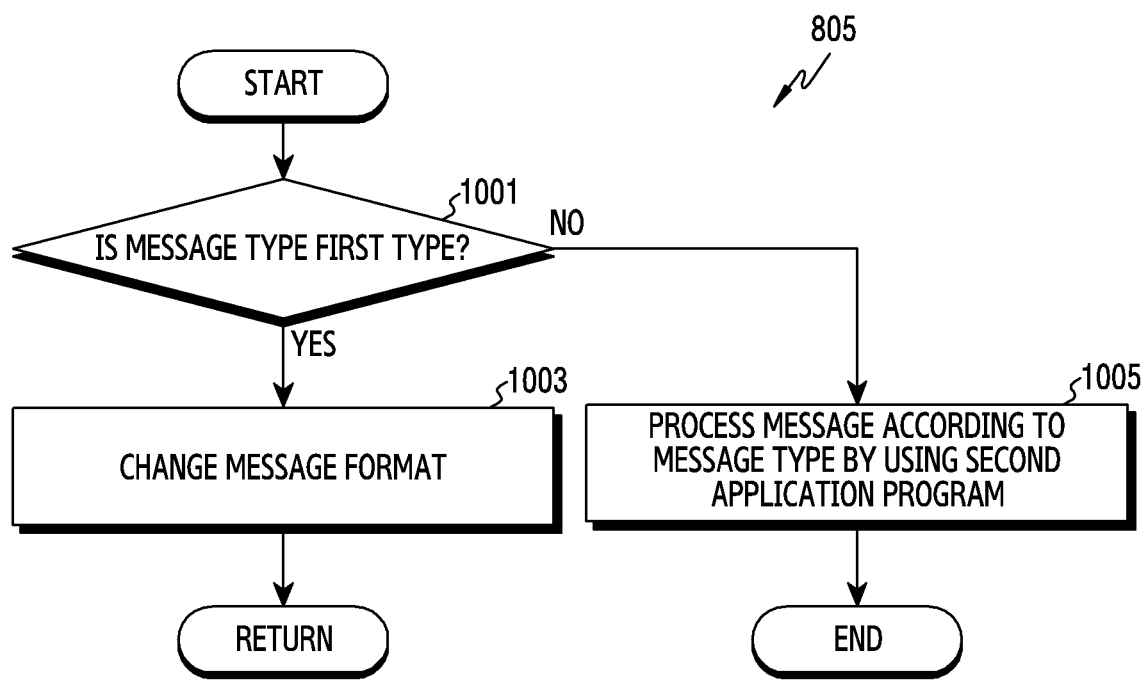
FIG. 10 is a flowchart of processing a received message in an electronic device according to various embodiments of the disclosure.

FIG. 10 is a flowchart of processing a received message in an electronic device according to various embodiments of the disclosure. Hereinafter, operation 805 of FIG. 8 will be described in detail. In the following embodiments, each of operations may be sequentially performed, but is not necessarily performed sequentially. For example, the order of each operation may be changed, and at least two operations may be performed in parallel. Here, an electronic device may be the electronic device 100 of FIG. 1, the electronic device 201 of FIG. 2, and/or the electronic device 401 of FIG. 4. In the following description, an external server may be the first server 130 and/or the first server 701.

Referring to FIG. 10, in operation 1001, an electronic device according to an embodiment may determine whether a data type of a message received from an external server is a first type. According to an embodiment, the processor (e.g., the processor 220 of FIG. 2 or the processor 420 of FIG. 4) of the electronic device may analyze the received message to determine a type of data included in the message, and may determine whether the determined type is the first type. For example, the processor (e.g., the processor 220 or the processor 420) of the electronic device may determine whether the TPDU included in a non-SMS format message received from the external server is data of the first type corresponding to the known SMS standard specification, on the basis of type information of the TPDU data included in the non-SMS format message.

According to an embodiment, if the data type of the received message is the first type, the electronic device may change a format of the message in operation 1003. According to an embodiment, the processor (e.g., the processor 220 or the processor 420) of the electronic device may change the non-SMS format message received from the external server to an SMS format message. For example, the processor (e.g., the processor 220 or the processor 420) of the electronic device may acquire at least one TPDU from the non-SMS format message, and as illustrated in FIG. 6A, may generate an SMS format message in which the acquired at least one TPDU is included in a payload area.

According to an embodiment, if the data type of the received message is not the first type, the electronic device may process the message according to the determined type by using the second application program, in operation 1005. According to an embodiment, if the type of the data included in the received non-SMS format message corresponds to the push notification message, the processor (e.g., the processor 220 or the processor 420) of the electronic device may display the push notification message on a display device (e.g., the display device 260 of FIG. 2 or the display device 440 of FIG. 4) by using a user interface of the second application program.

In FIG. 10 above, it is described that, if the data type of the received message is not the first type, the message is processed according to the determined type by using the second application program. According to various embodiments, if the data type of the received message is not the first type, the received message may be processed by another application. For example, if the data type of the received message is not the first type, the electronic device may provide the received message to a third application and may process the received message by using the third application. The third application may include various kinds of applications, such as a launcher application program, an OS notification bar application, a game application, or a service application (e.g., a shopping application or a bank application). For example, the processor (e.g., the processor 220 or the processor 420) of the electronic device may display the received message on the display device (e.g., the display device 260 of FIG. 2 or the display device 440 of FIG. 4) by using the OS notification bar application. As another example, the processor (e.g., the processor 220 or the processor 420) of the electronic device may display the received message on the display device (e.g., the display device 260 of FIG. 2 or the display device 440 of FIG. 4) by using a service application.

Figure 11:
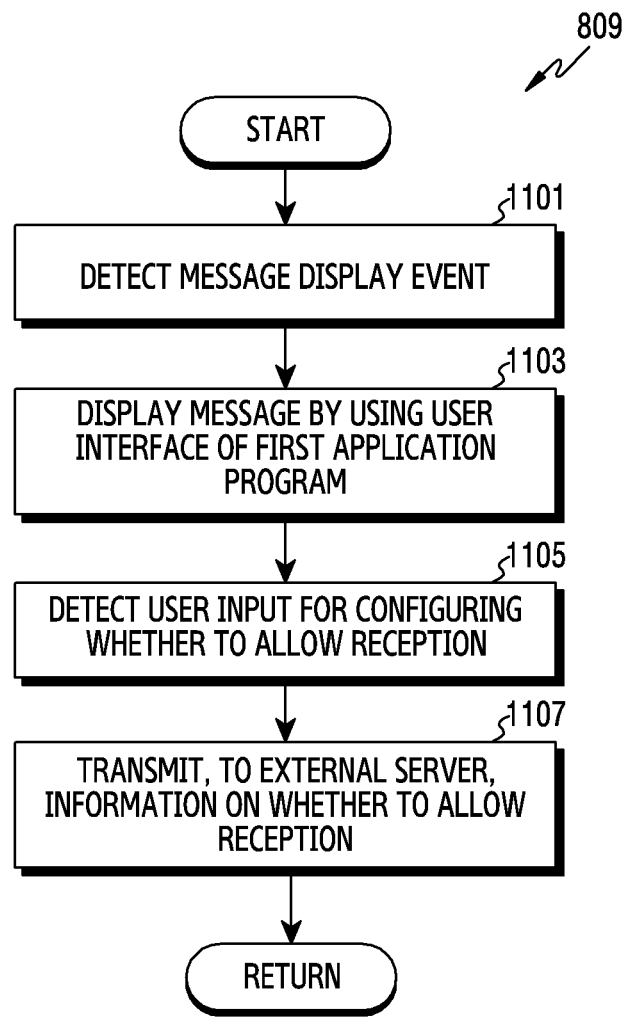
FIG. 11 is a flowchart of configuring whether to allow a received message in an electronic device according to various embodiments of the disclosure.
Figure 12:
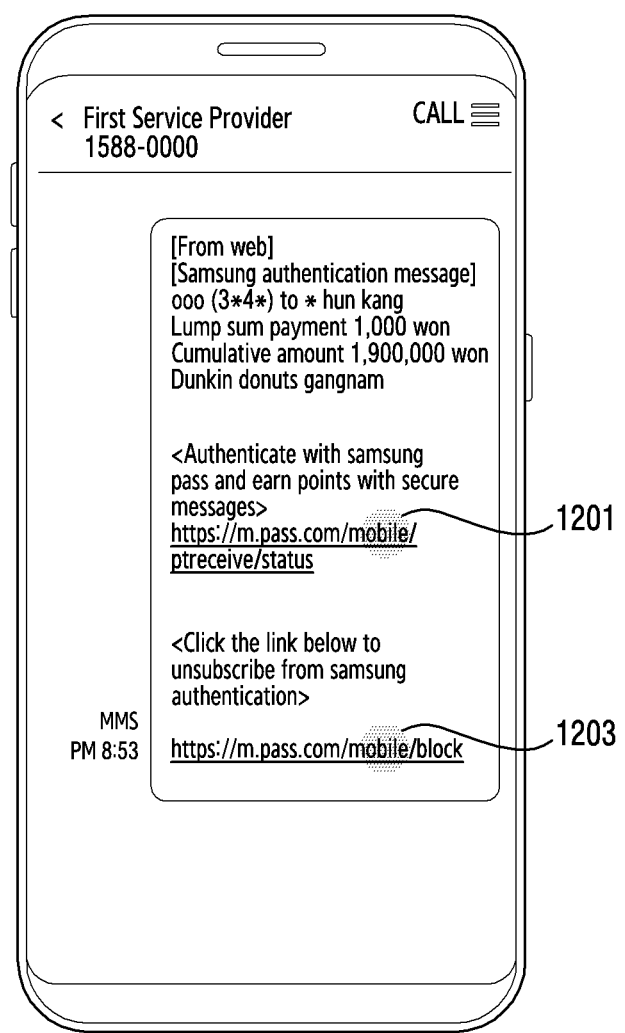
FIG. 12 illustrates a screen configuration of displaying a received message in an electronic device according to various embodiments of the disclosure.

FIG. 11 is a flowchart of configuring whether to allow a received message in an electronic device according to various embodiments of the disclosure. Hereinafter, operation 809 of FIG. 8 will be described in detail. In the following embodiments, each of operations may be sequentially performed, but is not necessarily performed sequentially. For example, the order of each operation may be changed, and at least two operations may be performed in parallel. Here, an electronic device may be the electronic device 100 of FIG. 1, the electronic device 201 of FIG. 2, and/or the electronic device 401 of FIG. 4. In the following description, an external server may be the first server 130 and/or the first server 701. Hereinafter, at least one operation of FIG. 11 will be described with reference to FIG. 12. FIG. 12 illustrates a screen configuration of displaying a received message in an electronic device according to various embodiments of the disclosure.

Referring to FIG. 11, an electronic device according to an embodiment may detect a message display event, in operation 1101. According to an embodiment, the message display event may include at least one of a user input detection event for a received message notification, a received message viewing event, or a first application program execution event related to the received message. For example, in a state where an indication indicating that the message has been received using the first application program is displayed on a display device (e.g., the display device 260 of FIG. 2 or the display device 440 of FIG. 4), the processor (e.g., the processor 220 of FIG. 2 or the processor 420 of FIG. 4) of the electronic device may determine whether a user input for viewing the received message is detected. If the user input for viewing the received message is detected, the processor (e.g., the processor 220 or the processor 420) of the electronic device may determine that the message display event has occurred. As another example, in the state where the indication indicating that the message has been received using the first application program is displayed on the display device (e.g., the display device 260 or the display 440), the processor (e.g., the processor 220 or the processor 420) of the electronic device may determine whether the user input for execution of the first application program is detected. If the user input for execution of the first application program is detected, the processor (e.g., the processor 220 or the processor 420) of the electronic device may determine that the message display event has occurred.

According to an embodiment, the electronic device may display the message by using the user interface of the first application program, in operation 1103. According to an embodiment, the processor (e.g., the processor 220 or the processor 420) of the electronic device may display the message received via the second application program on the display device (e.g., the display device 260 or the display device 440) by using the user interface of the first application program. For example, as illustrated in FIG. 12, the processor (e.g., the processor 220 or the processor 420) of the electronic device may display the received message on the display device (e.g., the display device 260 or the display device 440) by using the user interface of the first application. According to an embodiment, the received message displayed on the display device (e.g., the display device 260 or the display device 440) via the user interface of the first application program may include at least one of a URL for allowing reception and a URL for rejecting reception. According to an embodiment, the received message displayed on the display device (e.g., the display device 260 or the display device 440) via the user interface of the first application program may include a first area for configuration of allowing reception and a second area for configuration of rejecting reception.

According to an embodiment, the electronic device may detect a user input for configuring whether to allow reception of the message, in operation 1105. According to an embodiment, the processor (e.g., the processor 220 or the processor 420) of the electronic device may detect a user input for a URL included in the received message, and may determine whether to allow reception on the basis of the URL, for which the user input is detected, and/or information related to the URL. For example, the processor (e.g., the processor 220 or the processor 420) of the electronic device may detect one of a user input 1201 for the URL for allowing reception of the message or a user input 1203 for the URL for rejecting reception of the message, and may determine whether to allow reception of the message. According to an embodiment, the processor (e.g., the processor 220 or the processor 420) of the electronic device may detect a user input for an area related to whether to allow reception from among the entire area of the received message, which is displayed on the display device (e.g., the display device 260 or the display device 440), and may determine whether to allow reception, on the basis of configuration information of the area in which a user input has been detected. For example, the processor (e.g., the processor 220 or the processor 420) of the electronic device may detect a user input for one of the first area for allowing reception of the message and the second area for rejecting reception of the message, and may determine whether to allow reception of the message.

According to an embodiment, the electronic device may transmit, to the external server, information on whether to allow reception, in operation 1107. According to an embodiment, the processor (e.g., the processor 220 or the processor 420) of the electronic device may transmit, to the external server, a signal including at least one of identification information of the electronic device, caller information of the received message, or information indicating whether to allow reception. The caller information of the received message may be acquired from the received message. The caller information of the received message may include, for example, identification information (e.g., a phone number or a service provider's name) of a second server e.g., the second server 130 of FIG. 1) having transmitted the received message. Information indicating whether to allow reception may include one of an indication indicating rejection of reception or an indication indicating allowing of reception.

Figure 13:
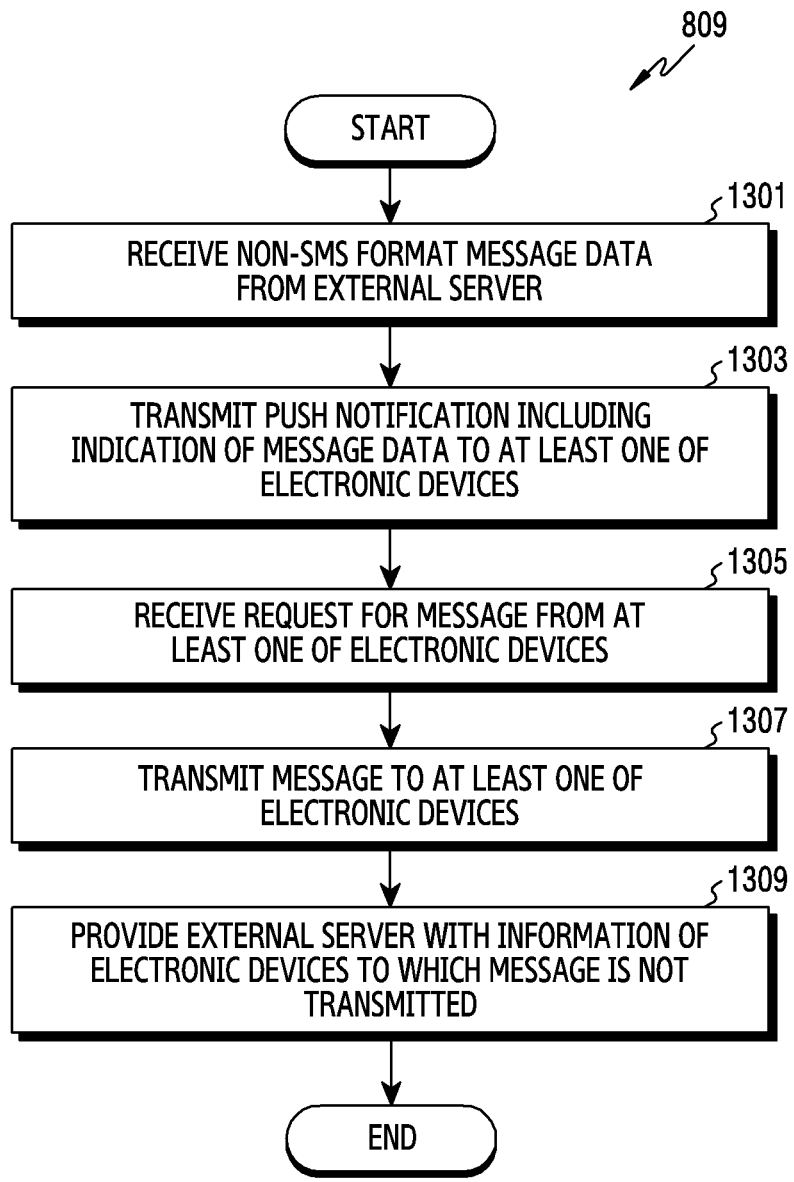
FIG. 13 is a flowchart of transmitting a message by using a push notification in a first server according to various embodiments of the disclosure.

FIG. 13 is a flowchart of transmitting a message by using a push notification in a first server according to various embodiments of the disclosure. In the following embodiments, each of operations may be sequentially performed, but is not necessarily performed sequentially. For example, the order of each operation may be changed, and at least two operations may be performed in parallel. Here, the first server may be the first server 120 of FIG. 1, the first server 480 of FIG. 4, and/or the first server 701 of FIG. 7. In the following description, at least one electronic device may be the electronic device 100 of FIG. 1, the electronic device 201 of FIG. 2, and/or the electronic device 401 of FIG. 4. The external server may be the second server 130 of FIG. 1 or the second server 490 of FIG. 4.

Referring to FIG. 13, a first server according to an embodiment may receive a non-SMS format message from an external server, in operation 1301. According to an embodiment, the non-SMS format message received from the external server may include data conforming to a known standard. For example, the non-SMS format message may include TPDU data conforming to 3GPP and 3GPP2 SMS standard specifications. According to an embodiment, a processor (e.g., the processor 720 of FIG. 7) of the first server may receive a receiver list for the non-SMS format message from the external server. The receiver list may include phone numbers of a plurality of respective electronic devices to which the non-SMS format message is transmitted.

According to an embodiment, the first server may transmit a push notification including an indication of the non-SMS format message to at least one electronic device among the plurality of electronic devices, in operation 1303. According to an embodiment, the processor (e.g., the processor 720) of the first server may determine at least one electronic device, to which the non-SMS format message is to be transmitted, on the basis of at least one of a receiver list for the non-SMS format message received from the external server, a subscriber list stored in the first server, or a rejection list stored in the first server. For example, if at least one first phone number which is included in the receiver list but is not included in the subscriber list exists, the processor (e.g., the processor 720 of FIG. 7) of the first server may determine that an electronic device corresponding to the at least one first phone number is an electronic device to which the non-SMS format message cannot be transmitted. As another example, if at least one second phone number which is included in the receiver list and the rejection list exists, the processor (e.g., the processor 720) of the first server may determine that an electronic device corresponding to the at least one second phone number is an electronic device to which the non-SMS format message cannot be transmitted. As still another example, the processor (e.g., the processor 720 of FIG. 7) of the first server may determine that electronic devices corresponding to third phone numbers, which are included in both of the receiver list and the subscriber list but are not included in the rejection list, are electronic devices to which the non-SMS format message can be transmitted. The processor (e.g., the processor 720 of FIG. 7) of the first server may transmit a push notification message including message identification information to the electronic devices corresponding to the at least one third phone number via a communication module (e.g., the communication module 740 of FIG. 7).

According to an embodiment, the first server may receive a request for the non-SMS format message from the at least one electronic device, in operation 1305. According to an embodiment, the request for the non-SMS format message may include the message identification information.

According to an embodiment, the first server may transmit the non-SMS format message to the at least one electronic device, in operation 1307. According to an embodiment, the processor (e.g., the processor 720 of FIG. 7) of the first server may acquire the message identification information from the request for the non-SMS format message, and may retrieve the non-SMS format message corresponding to the acquired message identification information from a memory (e.g., the memory 730 of FIG. 7). The processor (e.g., the processor 720) of the first server may control the communication module (e.g., the communication module 740) to transmit the non-SMS format message retrieved from the memory (e.g., the memory 730) to at least one electronic device having transmitted a message request signal.

According to an embodiment, the first server may provide the external server with information of electronic devices to which the non-SMS format message is not transmitted, in operation 1309. According to an embodiment, the processor (e.g., the processor 720) of the first server may provide the external server with information of a phone number, to which the push notification message is not transmitted, from among a plurality of phone numbers included in the receiver list. For example, the processor (e.g., the processor 720) of the first server may transmit information on at least one of at least one first phone number, which is included in the receiver list but is not included in the subscriber list, or at least one second phone number included in the receiver list and the rejection list, to the external server via the communication module (e.g., the communication module 740). According to an embodiment, the processor (e.g., the processor 720) of the first server may notify that the electronic device corresponding to at least one first phone number is not registered in a push notification service, by transmitting a non-registration signal including at least one first phone number to the external server. According to an embodiment, the processor (e.g., the processor 720 of FIG. 7) of the first server may notify that the electronic device corresponding to at least one second phone number has rejected reception of the non-SMS format message, by transmitting a reception rejecting signal including at least one second phone number to the external server via the communication module (e.g., the communication module 740).

Figure 14A:
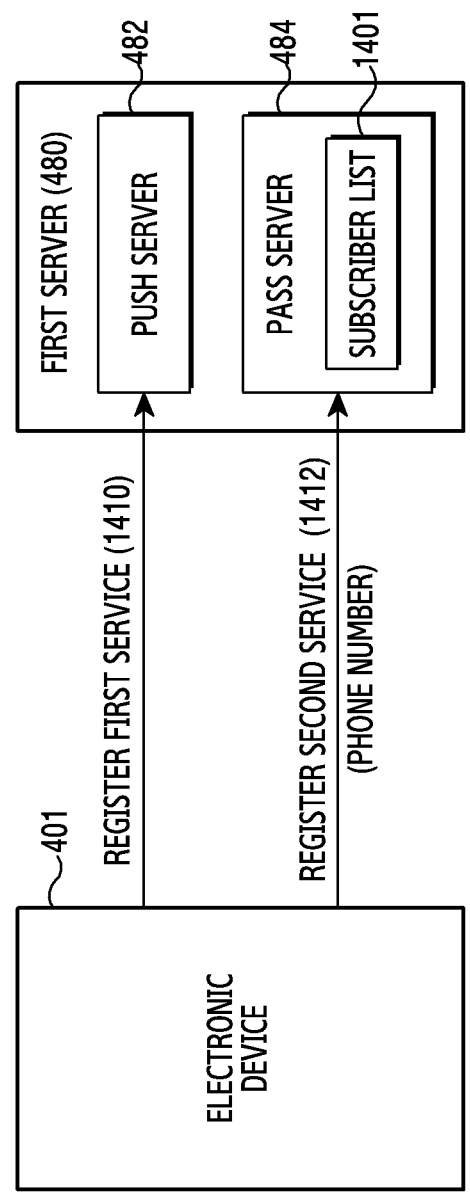
FIG. 14A to FIG. 14C illustrate signal flows within a system according to various embodiments of the disclosure.
Figure 14B:
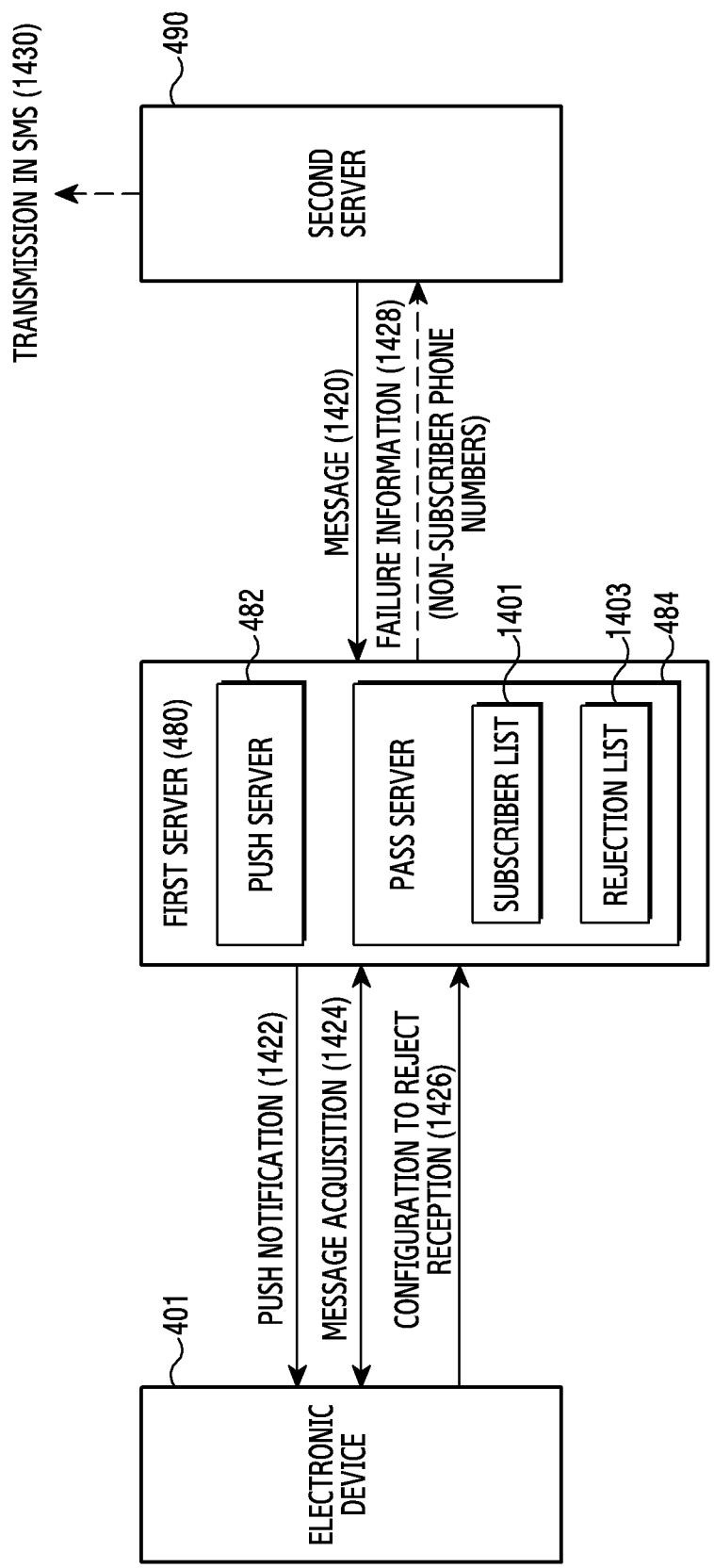
Figure 14C:
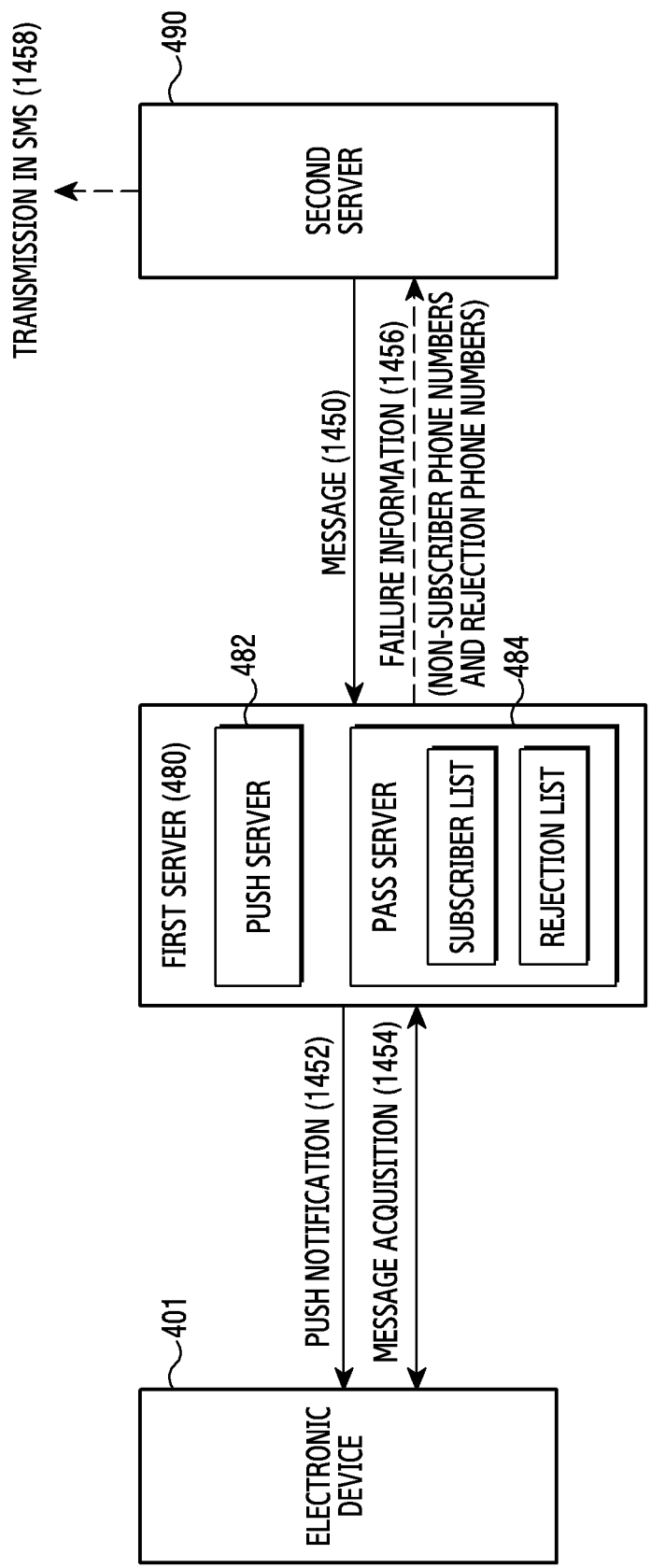

FIG. 14A to FIG. 14C illustrate signal flows within a system according to various embodiments of the disclosure. In the following embodiments, each of operations may be sequentially performed, but is not necessarily performed sequentially. For example, the order of each operation may be changed, and at least two operations may be performed in parallel. Here, an electronic device 401 may be the electronic device 100 of FIG. 1, the electronic device 201 of FIG. 2, and/or the electronic device 401 of FIG. 4. Here, a first server 480 may be the first server 120 of FIG. 1, the first server 480 of FIG. 4, and/or the first server 701 of FIG. 7.

FIG. 14A illustrates a service registration procedure of the electronic device 401 according to various embodiments of the disclosure. According to an embodiment, in operation 1410, the electronic device 401 may transmit a first service registration signal to the push server 482 of the first server 120. According to an embodiment, in operation 1412, the electronic device 1401 may transmit a second service registration signal to the pass server 484 of the first server 120. According to an embodiment, the first service registration signal may include caller identification information (e.g., a sender ID) of the electronic device 401, and the second service registration signal may include a phone number of the electronic device 401. According to an embodiment, the second service registration signal may include a registration token for a non-SMS format application (e.g., the second application program 514 of FIG. 5) assigned from the push server 482 of the first server 480. According to an embodiment, the electronic device 401 may further transmit at least one of international mobile equipment identity (IMEI) or a serial number, as identification information of the electronic device 401, to the push server 482 and/or pass server 484 of the first server 120. According to an embodiment, the first service registration signal in operation 1410 and the second service registration signal in operation 1412 may be configured as one signal and transmitted to the first server 480. According to an embodiment, the first server 480 may receive a first service registration request signal and/or a second service registration request signal from the electronic device 401, and may register the electronic device 401 in a push service on the basis of the identification information (e.g., the caller identification information, the phone number, the IMEI, or the serial number) of the electronic device, which is included in the received first service registration request signal and/or second service registration request signal. According to an embodiment, the pass server 484 of the first server 480 may generate and update a subscriber list 1401 on the basis of the second service registration request signal received from the electronic device 401.

FIG. 14B illustrates a message transmission procedure according to various embodiments of the disclosure.

According to an embodiment, in operation 1420, the second server 490 may transmit a message to the first server 480. For example, the second server 490 may transmit a non-SMS format message to the first server 480. The first server 480 having received the message from the second server 490 may compare a receiver list for the message received from the second server 490 with a subscriber list stored in the pass server 484, so as to determine whether phone numbers included in the receiver list subscribe to a push notification service. For example, the first server 480 may determine at least one phone number included in the subscriber list from among phone numbers included in the receiver list, as a phone number of a subscriber of the push notification service. The first server 480 may determine at least one phone number that is not included in the subscriber list from among phone numbers included in the receiver list, as a phone number of a non-subscriber of the push notification service.

According to an embodiment, in operation 1422, the first server 480 may transmit a push notification message to the electronic device 401 corresponding to the phone number of the subscriber of the push notification service. According to an embodiment, the push notification message may include an indication indicating that the non-SMS format message received from the second server 490 exists.

According to an embodiment, in operation 1424, the first server 480 may transmit the message received from the second server 490 to the electronic device 401. According to an embodiment, the first server 480 may receive a message transmission request from the electronic device 401 and may transmit the message to the electronic device 401 in response thereto.

According to an embodiment, in operation 1426, the electronic device 401 may detect a user input for configuring rejection of message reception, and may transmit a signal for requesting a reception rejecting configuration to the first server 480. The first server 480 having received the signal for requesting the reception rejecting configuration may generate and/or update the rejection list 1403. For example, the first server 480 may add the phone number of the electronic device 401 to the rejection list related to the second server 490.

According to an embodiment, in operation 1428, the first server 480 may transmit, to the second server 490, failure information including a phone number that is not included in the subscriber list from among phone numbers included in the receiver list, for example, a non-subscriber phone number. According to an embodiment, if a phone number, which is not included in the subscriber list from among phone numbers included in the receiver list, does not exist, operation 1428 may be omitted.

According to an embodiment, in operation 1430, the second server 490 may transmit an SMS to an electronic device corresponding to a non-subscriber phone number. For example, the second server 490 may check the non-subscriber phone number from the failure information received from the first server 480, and may transmit an SMS message to the electronic device corresponding to the checked phone number over a circuit switched network.

FIG. 14C illustrates a message transmission procedure according to various embodiments of the disclosure.

According to an embodiment, in operation 1450, the second server 490 may transmit a message to the first server 480. For example, the second server 490 may transmit a non-SMS format message to the first server 480. The first server 480 having received the message from the second server 490 may compare a receiver list for the message received from the second server 490, a subscriber list stored in the pass server 484, and a rejection list related to the second server 490, so as to determine whether phone numbers included in the receiver list subscribe to a push notification service and whether the phone numbers included in the receiver list reject message reception. For example, the first server 480 may determine at least one phone number which is included in the subscriber list but is not included in the rejection list from among phone numbers included in the receiver list, as a phone number which subscribes to the push notification service and does not reject reception of a message from the second server 490. As another example, the first server 480 may determine at least one phone number which is included in the subscriber list and the rejection list from among phone numbers included in the receiver list, as a phone number which subscribes to the push notification service but rejects reception of a message from the second server 490. As still another example, the first server 480 may determine at least one phone number that is not included in the subscriber list from among phone numbers included in the receiver list, as a phone number of a non-subscriber of the push notification service.

According to an embodiment, in operation 1452, the first server 480 may transmit a push notification message to the electronic device 401 corresponding to the phone number which subscribes to the push notification service and does not reject message reception. According to an embodiment, the push notification message may include an indication indicating that the non-SMS format message received from the second server 490 exists.

According to an embodiment, in operation 1454, the first server 480 may transmit the message received from the second server 490 to the electronic device 401. According to an embodiment, the first server 480 may receive a message transmission request from the electronic device 401 and may transmit the message to the electronic device 401 in response thereto. Although not illustrated, according to an embodiment, the electronic device 401 may detect a user input for configuring rejection of message reception, and may transmit a signal for requesting a reception rejecting configuration to the first server 480. The first server 480 having received the signal for requesting the reception rejecting configuration may generate and/or update the rejection list 1403.

According to an embodiment, in operation 1456, the first server 480 may transmit, to the second server 490, failure information including a non-subscriber phone number or a phone number which subscribes to the service but rejects message reception from among phone numbers included in the receiver list. According to an embodiment, if a non-subscriber phone number and/or a phone number which subscribes to the service but rejects message reception are not present among phone numbers included in the receiver list, does not exist, operation 1456 may be omitted.

According to an embodiment, in operation 1458, the second server 490 may transmit an SMS to an electronic device corresponding to a non-subscriber phone number. For example, the second server 490 may check the non-subscriber phone number from the failure information received from the first server 480, and may transmit an SMS message to the electronic device corresponding to the checked phone number over a circuit switched network. According to an embodiment, the second server 490 may store a list including phone numbers having configured rejection of message reception, and may use the stored list when generating a receiver list for the message that will be transmitted to the first server 480 at a later time.

Figure 15:
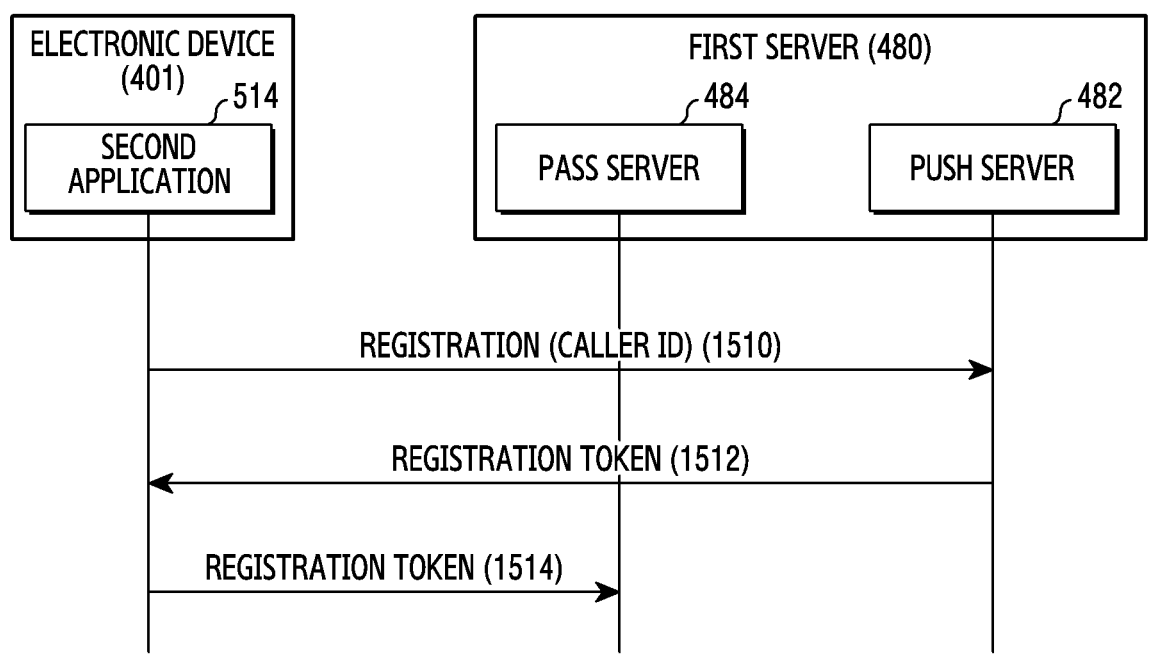
FIG. 15 illustrates a signal flow for registration of an electronic device in a system according to various embodiments of the disclosure.

FIG. 15 illustrates a signal flow for registration of an electronic device in a system according to various embodiments of the disclosure. In the following embodiments, each of operations may be sequentially performed, but is not necessarily performed sequentially. For example, the order of each operation may be changed, and at least two operations may be performed in parallel. In the following description, the electronic device 401 may be the electronic device 100 of FIG. 1, the electronic device 201 of FIG. 2, and/or the electronic device 401 of FIG. 4, and the second application 514 may be the second application program 514 of FIG. 5. Here, a first server 480 may be the first server 120 of FIG. 1, the first server 480 of FIG. 4, and/or the first server 701 of FIG. 7.

Referring to FIG. 15, the electronic device 401 according to an embodiment may transmit, in operation 1510, a registration request signal including caller identification information to the push server 482 of the first server 480 by using the second application 514. According to an embodiment, the caller identification information may be information previously acquired from the push server 482 of the first server 480 by a developer in a development stage of the electronic device. For example, a server key and caller identification information may be acquired from the push server 482 of the first server 480 by the developer in the development stage of the electronic device. Server key information may be information used to access the push server 482 of the first server 480 by the pass server 484 of the first server 480. The caller identification information may be identification information of the electronic device 401, which is used to identify the electronic device 401 by the push server 482 and/or the pass server 484 of the first server 480. The server key may be registered in the pass server of the first server 480, and the caller identification information may be registered in the second application 514 by the developer.

According to an embodiment, the push server 482 of the first server 480 may transmit a registration token for the second application 514 to the electronic device 401, in operation 1512. The registration token may be used as authentication information for the second application. The push server 482 of the first server 480 may assign the same registration token to the same application of another electronic device.

According to an embodiment, the electronic device 401 may transmit the registration token assigned from the push server 482 of the first server 480 to the pass server 484 of the first server 480 by using the second application 514, in operation 1514. According to an embodiment, the electronic device 401 may further transmit identification information of the electronic device 401 to the pass server 484 of the first server 480. For example, the electronic device 401 may further transmit at least one of a phone number, IMEI, or a serial number of the electronic device 401 while transmitting the registration token for the second application 514 to the pass server 484 of the first server 480.

Figure 16:
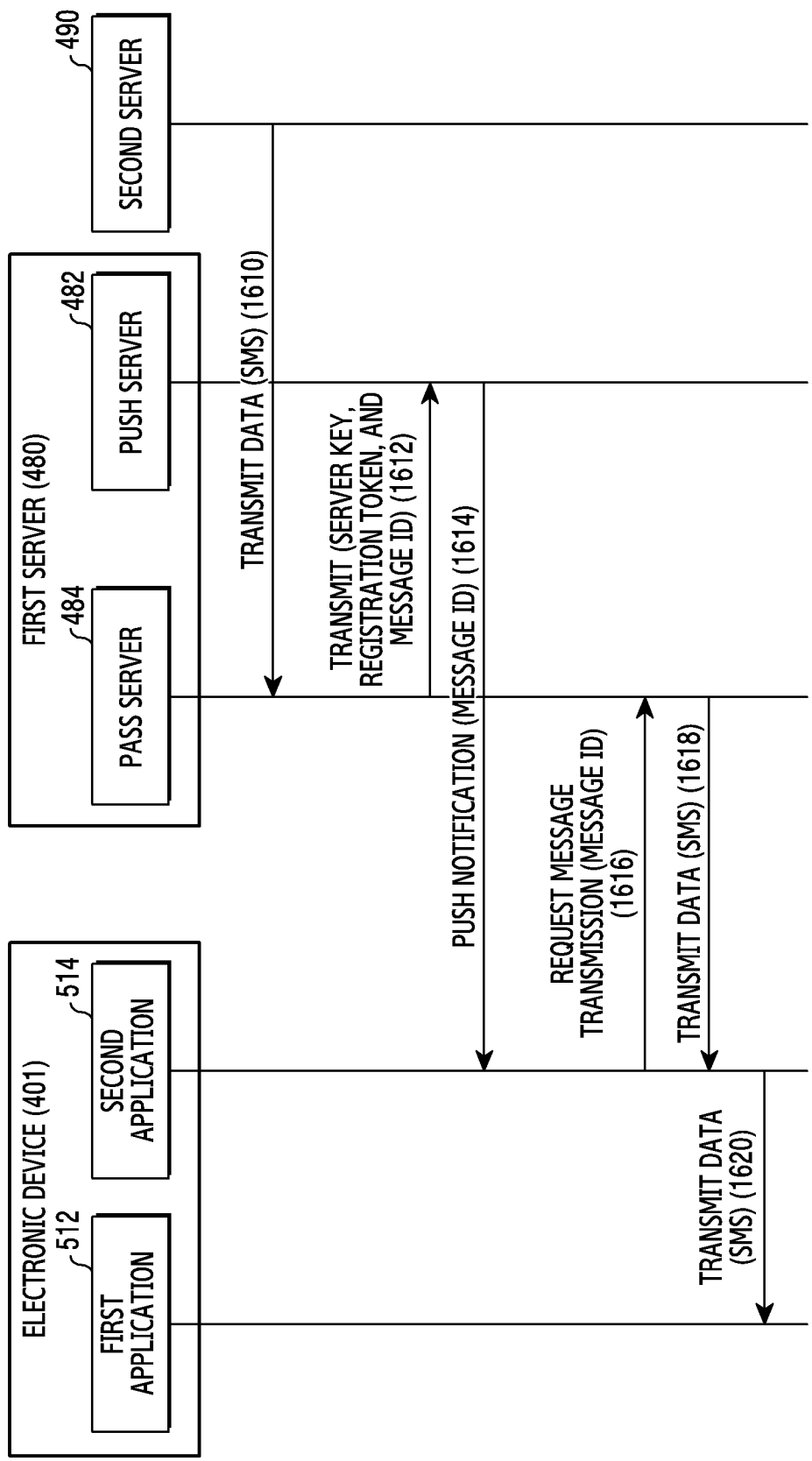
FIG. 16 illustrates a signal flow for providing a message by using a push notification in a system according to various embodiments of the disclosure.

FIG. 16 illustrates a signal flow for providing a message by using a push notification in a system according to various embodiments of the disclosure. In the following embodiments, each of operations may be sequentially performed, but is not necessarily performed sequentially. For example, the order of each operation may be changed, and at least two operations may be performed in parallel. In the following description, the electronic device 401 may be the electronic device 100 of FIG. 1, the electronic device 201 of FIG. 2, and/or the electronic device 401 of FIG. 4. The first application 512 may be the first application program 512 of FIG. 5, and the second application 514 may be the second application program 514 of FIG. 5. The first server 480 may be the first server 120 of FIG. 1, the first server 480 of FIG. 4, and/or the first server 701 of FIG. 7. The second server 490 may be the second server 130 of FIG. 1 and/or the second server 490 of FIG. 4.

Referring to FIG. 16, the second server 490 according to an embodiment may transmit data to the pass server 484 of the first server 480, in operation 1610. For example, the second server 490 may transmit data of a non-SMS format message to the pass server 484 of the first server 480. The non-SMS format message may be, for example, a message including, in at least a part thereof, data conforming to a known SMS standard specification (e.g., 3GPP or 3GPP2 SMS standard specification).

According to an embodiment, the pass server 484 of the first server 480 may transmit a signal including at least one of a server key, a registration token, or a message ID to the push server 482 of the first server 480, in operation 1612. According to an embodiment, the server key may be registered in the pass server 484 by a developer in a development stage of the electronic device 401, and the registration token may be received from the electronic device 401 and registered during a registration procedure of the electronic device 401. According to an embodiment, the pass server 484 of the first server 480 may identify, on the basis of a receiver list for the message received from the second server 490, electronic devices to which the message is to be transmitted, and may retrieve registration tokens and server keys related to the identified electronic devices. According to an embodiment, the pass server 484 of the first server 480 may assign a message ID to the data received from the second server 490, and may provide the first server 480 with a signal including the assigned message ID, a retrieved server key, and a retrieved registration token.

According to an embodiment, the push server 482 of the first server 480 may transmit a push notification message including the message ID to the electronic device 401, in operation 1614. According to an embodiment, the push server 482 of the first server 480 may determine, on the basis of the server key and the registration token which are included in the signal received from the pass server 484 of the first server 480, whether the signal received from the pass server 484 of the first server 480 is a valid signal. For example, if the server key and the registration token, which are included in the signal received from the pass server 484 of the first server 480, match a server key and a registration token which are previously registered in the push server 482 of the first server 480, the push server 482 of the first server 480 may determine that the signal is a valid signal. As another example, if the server key and the registration token, which are included in the signal received from the pass server 484 of the first server 480, do not match a server key and a registration token which are previously registered in the push server 482 of the first server 480, the push server 482 of the first server 480 may determine that the signal is not a valid signal, and may discard the signal. According to an embodiment, if the signal received from the pass server 484 of the first server 480 is determined to be a valid signal, the push server 482 of the first server 480 may transmit the push notification message including the message ID to the electronic device 401 via an Internet protocol network. The push server 482 of the first server 480 transmits the push notification message to the electronic device 401 via an Internet protocol, so that the push notification message may be provided to the second application 514 of the electronic device 401.

According to an embodiment, the electronic device 401 may receive the push notification message by using the second application 514. In operation 1616, the electronic device 401 may acquire the message ID from the push notification message by using the second application 514, and may transmit a message transmission request signal including the message ID to the pass server 484 of the first server 480.

According to an embodiment, in operation 1618, the pass server 484 of the first server 480 may retrieve data corresponding to the message ID, and may transmit a non-SMS format message including the retrieved data to the second application 514 of the electronic device 401. The retrieved data may be data conforming to a known SMS standard specification (e.g., 3GPP or 3GPP2 SMS standard specification). According to an embodiment, the pass server 484 of the first server 480 may transmit the non-SMS format message to the electronic device 401 via the Internet protocol network. The pass server 484 of the first server 480 may transmit the non-SMS format message to the electronic device 401 via the Internet processor, so that the non-SMS format message may be provided to the second application 514 of the electronic device 401.

According to an embodiment, the electronic device 401 may receive the non-SMS format message by using the second application 514. In operation 1620, the electronic device 401 may change the non-SMS format message to an SMS format message by using the second application 514, and may provide the changed SMS format message to the first application 512. The electronic device 401 may process the SMS format message by using the first application 512.

Figure 17:
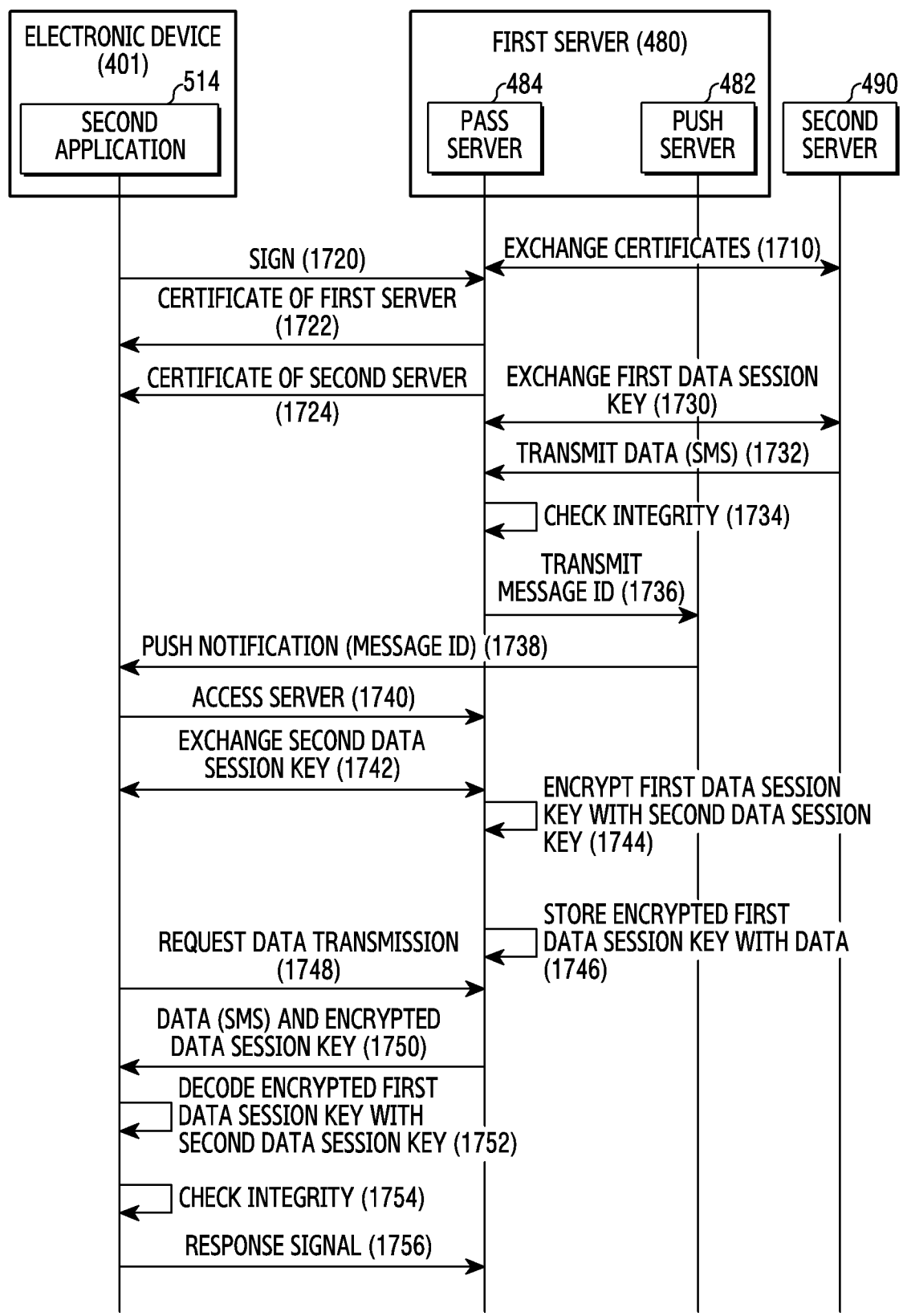
FIG. 17 illustrates a signal flow for checking integrity of a message in a system according to various embodiments of the disclosure.

FIG. 17 illustrates a signal flow for checking integrity of a message in a system according to various embodiments of the disclosure. In the following embodiments, each of operations may be sequentially performed, but is not necessarily performed sequentially. For example, the order of each operation may be changed, and at least two operations may be performed in parallel. In the following description, the electronic device 401 may be the electronic device 100 of FIG. 1, the electronic device 201 of FIG. 2, and/or the electronic device 401 of FIG. 4. The second application 514 may be the second application program 514 of FIG. 5. The first server 480 may be the first server 120 of FIG. 1, the first server 480 of FIG. 4, and/or the first server 701 of FIG. 7. The second server 490 may be the second server 130 of FIG. 1 and/or the second server 490 of FIG. 4.

Referring to FIG. 17, in operation 1710 according to an embodiment, the pass server 484 of the first server 480 may exchange certificates with the second server 490. In operation 1710, the electronic device 401 may transmit a signature signal to the pass server 484 of the first server 480. The signature signal may include a certificate of the electronic device 401. In operation 1722 and operation 1724, the electronic device 401 may receive a certificate of the first server 480 and a certificate of the second server 490 from the pass server 484 of the first server 480 in response to the signature signal. Operations 1710, 1720, 1722 and 1724 described above may be performed once in advance, and operations 1730 to 1754 which will be described in the following may be repeatedly performed at each point of time when message transmission is requested from the second server 490.

According to an embodiment, in operation 1730, each of the second server 490 and the pass server 484 of the first server 480 may generate a first data session key for an integrity check on the basis of the exchanged certificates, and may exchange the generated first data session key. According to an embodiment, each of the second server 490 and the pass server 484 of the first server 480 may generate and exchange a first data session key on the basis of each of the certificate of the first server and the certificate of the second server. According to an embodiment, the second server 490 may generate a first data session key for message transmission and may transmit the same to the pass server 484 of the first server 480, and if the first data session key of the second server 490 is received, the pass server 484 of the first server 480 may generate a first data session key of the first server 480 on the basis of the previously exchanged certificates and may transmit the same to the second server 490.

According to an embodiment, in operation 1732, the second server 490 may sign the non-SMS format message including data conforming to the SMS standard specification (e.g., 3GPP or 3GPP2 SMS standard specification) by using the first data session key exchanged with the pass server 484 of the first server 480, and may transmit the signed non-SMS format message to the pass server 484 of the first server 480.

According to an embodiment, in operation 1734, the pass server 484 of the first server 480 may perform an integrity check for the non-SMS format message received from the second server 490, by using the first data session key exchanged with the second server 490. If the integrity check determines that integrity is secured, the pass server 484 of the first server 480 may transmit a signal including a message ID to the push server 482 of the first server 480, in operation 1736. The signal in operation 1736 may be configured to be the same as the signal in operation 1612 of FIG. 16.

According to an embodiment, the push server 482 of the first server 480 may transmit a push notification message including the message ID to the electronic device 401, in operation 1738. Operation 1738 may be performed in the same manner as operation 1614 of FIG. 16.

According to an embodiment, the electronic device 401 having received the push notification message from the push server 482 of the first server 480 may access the pass server 484 of the first server 480 in operation 1740. According to an embodiment, in operation 1742, the electronic device 401 and the pass server 484 of the first server 480 may generate a second data session key on the basis of the previously exchanged certificates, and may exchange the generated second data session key.

According to an embodiment, the pass server 484 of the first server 480 may encrypt, in operation 1744, the first data session key by using the second data session key, and may store, in operation 1746, the encrypted first data session key with the non-SMS format message which is received from the second server 490 and includes data conforming to the SMS standard specification.

According to an embodiment, in operation 1748, the electronic device 401 may transmit, to the pass server 484 of the first server 480, a signal for requesting to transmit a message corresponding to the message ID included in the push notification message. According to an embodiment, in operation 1750, the pass server 484 of the first server 480 may transmit the encrypted first data session key and the non-SMS format message including data conforming to the SMS standard specification to the electronic device 401.

According to an embodiment, in operation 1752, the electronic device 401 may acquire the first data session key by decoding the received encrypted first data session key by using the second data session key. According to an embodiment, in operation 1754, the electronic device 401 may check integrity of the non-SMS format message including data conforming to the SMS standard specification on the basis of the first data session key.

According to an embodiment, in operation 1756, the electronic device 401 may transmit a result signal for the integrity check to the pass server 484 of the first server 480. For example, if it is determined that the integrity of the received non-SMS format message is not secured, the electronic device 401 may transmit an NACK response signal to the pass server 484 of the first server 480, and if it is determined that the integrity of the received non-SMS format message is secured, the electronic device 401 may transmit an ACK response signal to the pass server 484 of the first server 480.

Figure 18:
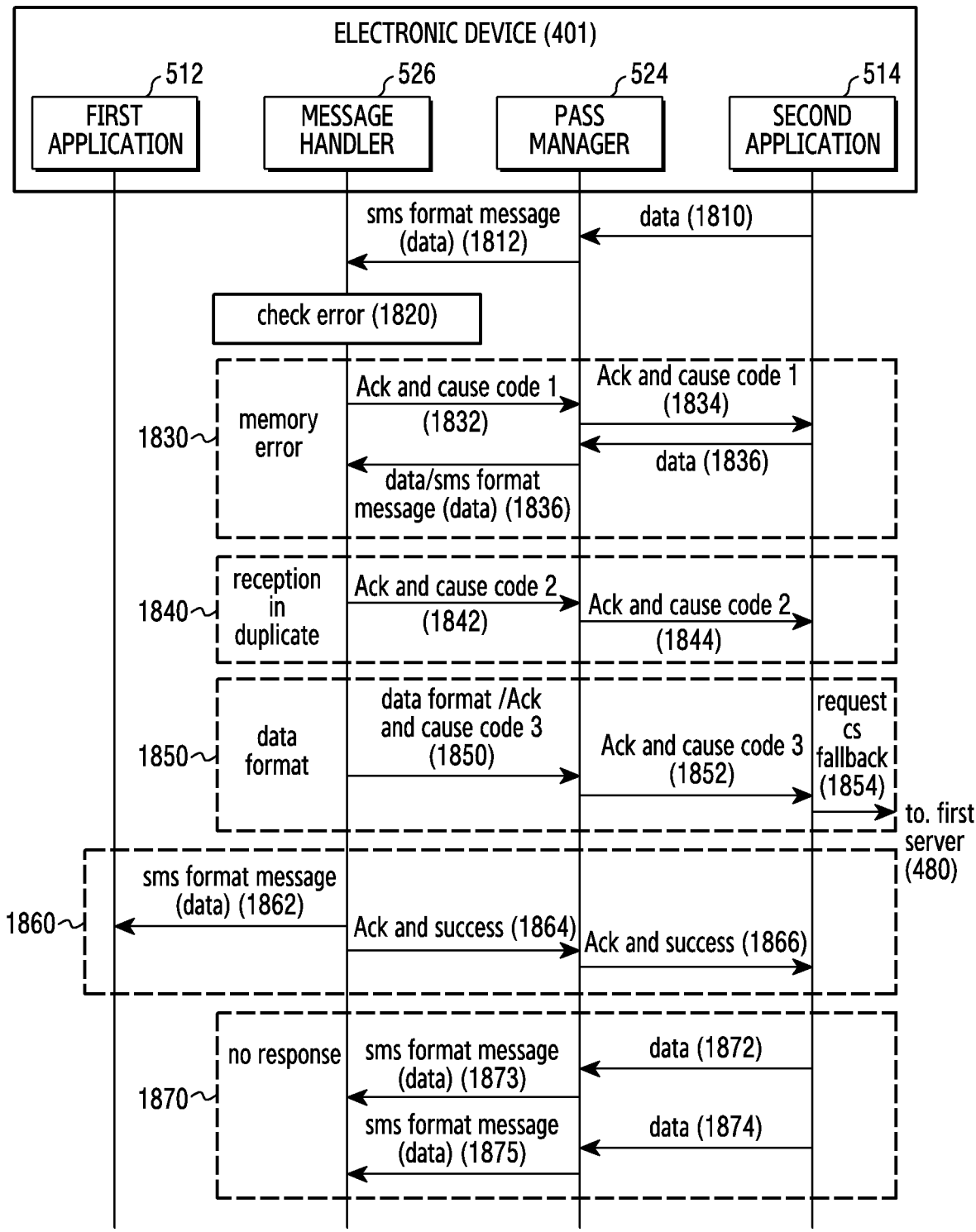
FIG. 18 illustrates a signal flow for processing an error related to a received message in an electronic device according to various embodiments of the disclosure.

FIG. 18 illustrates a signal flow for processing an error related to a received message in an electronic device according to various embodiments of the disclosure. In the following embodiments, each of operations may be sequentially performed, but is not necessarily performed sequentially. For example, the order of each operation may be changed. In the following description, the electronic device 401 may be the electronic device 100 of FIG. 1, the electronic device 201 of FIG. 2, and/or the electronic device 401 of FIG. 4. The first application 512 may be the first application program 512 of FIG. 5, and the second application 514 may be the second application program 514 of FIG. 5. The pass manager 524 may be configured to include at least one of the pass manager 524, the pass converter 522, or the pass interface 528 of FIG. 5, and the message handler 526 may be the message handler 526 of FIG. 5.

Referring to FIG. 18, the second application 514 of the electronic device 401 according to an embodiment may provide data included in a non-SMS format message to the pass manager 524, in operation 1810. According to an embodiment, the non-SMS format message may include TPDU data conforming to a known SMS standard specification. The second application 514 may extract TPDU data conforming to the SMS standard specification from the non-SMS format message, and may provide the extracted TPDU data to the pass manager 524.

According to an embodiment, the pass manager 524 of the electronic device 401 may change the data received from the second application 514 to an SMS format message and may transmit the same to the message handler 526, in operation 1812. For example, the pass manager 524 may generate the SMS format message as shown in FIG. 6, on the basis of the TPDU data received from the second application 514.

According to an embodiment, in operation 1820, the message handler 526 may determine whether an error occurs, on the basis of at least one of whether it is possible to store the received SMS format message, whether the received SMS format message is received in duplicate, or whether it is possible to perform data format processing for the received SMS format message. According to an embodiment, the message handler 526 may generate a signal corresponding to whether an error occurs, and at least one of operation 1830, operation 1840, operation 1850, operation 1860, or operation 1870 may be performed according to the generated signal. According to an embodiment, the message handler 526 may determine whether it is possible to store the received SMS format message, on the basis of a remaining memory capacity and a size of the received SMS format message. If the remaining memory capacity is smaller than the size of the received SMS format message, the message handler 526 may generate a first cause code indicating that the received SMS format message cannot be stored due to a memory capacity. According to an embodiment, the message handler 526 may determine whether the received SMS format message is received in duplicate, and if the message is received in duplicate, the message handler 526 may generate a second cause code indicating that the received SMS format message has been received in duplicate. According to an embodiment, the message handler 526 may determine whether a format of data included in the received SMS format message is a data format which can be processed by the first application program, and if the format of data included in the received SMS format message is not a data format which can be processed by the first application program, the message handler 526 may generate a third cause code indicating a data format error of the received SMS format message. According to an embodiment, if the remaining memory capacity is equal to or greater than the size of the received SMS format message, the received SMS format message is not received in duplicate, and the data format of the received SMS format message is a data format which can be processed by the first application program, the message handler 526 may determine that an error for the received SMS format message has not occurred.

According to an embodiment, if the first cause code is generated by the message handler 526, operation 1830 may be performed. The message handler 526 may provide ACK and the first cause code to the pass manager 524, in operation 1832. The pass manager 524 having received the ACK and the first cause code may transfer the ACK and the first cause code to the second application 514, in operation 1834. According to an embodiment, as illustrated in FIG. 6B, the pass manager 524 may transmit a response message including the first cause code to the second application 514. The second application 514 may determine that the message handler 526 has received the TPDU transmitted in operation 1810 but a memory error has occurred, on the basis of the first cause code received from the pass manager 524. According to an embodiment, the second application 514 may perform an operation for displaying an alert message (or indication) indicating an insufficient memory capacity or an alert message (or indication) for requesting to secure a memory capacity on a display device (e.g., the display device 260 of FIG. 2 or the display device 440 of FIG. 4). The second application 514 may retransmit the data included in the non-SMS format message to the pass manager 524 in response to the first cause code, in operation 1836. For example, the data retransmitted to the pass manager 524 in operation 1836 may be the same as the data transmitted to the pass manager 524 in operation 1810. According to an embodiment, the second application 514 may perform operation 1836 in response to detecting that a memory capacity larger than a reference capacity is secured. The reference capacity may be configured by a developer in advance, or may be configured on the basis of the size of the TPDU included in the received non-SMS format message. In operation 1836, the pass manager 524 may change a format of the data received from the second application 514 to an SMS format and may transmit the format changed data to the message handler 526. The message handler 526 having received the SMS format message again may re-perform operation 1820.

According to an embodiment, if the second cause code is generated by the message handler 526, operation 1840 may be performed. The message handler 526 may provide ACK and the second cause code to the pass manager 524, in operation 1842. The pass manager 524 having received the ACK and the second cause code may transfer the ACK and the second cause code to the second application 514, in operation 1844. According to an embodiment, as illustrated in FIG. 6B, the pass manager 524 may transmit a response message including the second cause code to the second application 514. The second application 514 may determine that the message handler 526 has received the TPDU transmitted in operation 1810 but the TPDU is received in duplicate, on the basis of the second cause code received from the pass manager 524. According to an embodiment, the second application 514 may determine that processing of the non-SMS format message has been completed. For example, the second application 514 may determine that the received non-SMS format message is the message which is previously received and then provided to the first application 512, and may discard the received non-SMS format message.

According to an embodiment, if the third cause code is generated by the message handler 526, operation 1850 may be performed. The message handler 526 may provide ACK and the third cause code to the pass manager 524, in operation 1852. The pass manager 524 having received the ACK and the third cause code may transfer the ACK and the third cause code to the second application 514, in operation 1854. According to an embodiment, as illustrated in FIG. 6B, the pass manager 524 may transmit a response message including the third cause code to the second application 514. The second application 514 may determine that the message handler 526 has received the TPDU transmitted in operation 1810 but an error caused by the data format has occurred, on the basis of the third cause code received from the pass manager 524. According to an embodiment, the second application 514 may transmit a CS fallback request signal to the first server 480, in operation 1856. For example, the second application 514 may transmit, to the first server 480, a signal for requesting to transmit the message via a circuit switched network. The CS fallback request signal may include an ID of the message. According to an embodiment, the CS fallback request signal may be a response message generated by the pass manager 524.

According to an embodiment, if the message handler 526 determines that no error has occurred, operation 1860 may be performed. The message handler 526 may provide the SMS format message to the first application 1512 in operation 1862, and may transfer ACK and a success signal to the pass manager 524 in operation 1864. The pass manager 524 having received the ACK and the success signal may transfer the ACK and the success signal to the second application 514, in operation 1854. According to an embodiment, the pass manager 524 may transmit a response message indicating ACK and success to the second application 514.

According to an embodiment, if the second application 514 fails to receive the response message (or the response signal) from the message handler 526, operation 1870 may be performed. For example, if the second application 514 fails to receive the response message from the message handler 526 within a preconfigured reference time from a point of time at which operation 1810 is performed, the second application 514 may perform operation 1870. The second application 514 may retransmit the data included in the non-SMS format message to the pass manager 524 in operation 1872. For example, the data retransmitted to the pass manager 524 in operation 1872 may be the same as the data transmitted to the pass manager 524 in operation 1810. In operation 1874, the pass manager 524 may change a format of the data received from the second application 514 to an SMS format and may transmit the format changed data to the message handler 526. The message handler 526 having received the SMS format message again may re-perform operation 1820. According to an embodiment, if the second application 514 fails to receive the response message from the message handler 526 within a preconfigured reference time from a point of time at which operation 1872 is performed, an operation of providing data from the second application 514 to the message handler 526 may be repeatedly performed as shown in operation 1874 and operation 1875. According to an embodiment, the operation of providing data from the second application 514 to the message handler 526 has been repeated a threshold number of times. However, if the second application 514 fails to receive the response message from the message handler 526, the second application 514 may transmit a processing failure signal for the non-SMS format message to the first server 480. The processing failure signal for the non-SMS format message may include, for example, information for requesting to transmit the non-SMS format message via the circuit switched network.

The invention claimed is:

1. An electronic device comprising:
   a display;
   a wireless communication circuit;
   a processor operatively connected to the communication circuit and the display; and
   a memory operatively connected to the processor, wherein the memory stores a first application program that is a short message service (SMS) application program, and a second application program that is a non-SMS application program, and the memory stores instructions causing, when executed, the processor to:
   receive a push notification from an external server via the communication circuit by using the second application program, wherein the push notification displays a message relating to the first application program;
   transmit a request for the message to the external server via the communication circuit by using the second application program;
   receive the message from the external server via the communication circuit by using the second application program;
   provide the message to the first application program by using the second application program; and
   display the message by using a user interface of the first application program.

2. The electronic device of claim 1, wherein the push notification comprises identification information for the message.

3. The electronic device of claim 1, wherein
   the instructions cause the processor to:
   receive the message in a first format; and
   convert the message into a second format which can be processed by the first application program.

4. The electronic device of claim 3, wherein the instructions cause the processor to:
   acquire at least one transport protocol data unit from the message in the first format; and generate the message in the second format, which comprises the acquired at least one transport protocol data unit.

5. The electronic device of claim 1, wherein the instructions cause the processor to:
   determine whether a type of data included in the message is a data type corresponding to the first application program by using the second application program;
   if the type of data is a data type corresponding to the first application program, provide the message to the first application program by using the second application program; and
   if the type of data is not a data type corresponding to the first application program, display the message by using a user interface of an application other than the first application, wherein the application other than the first application comprises the second application.

6. The electronic device of claim 1, wherein the instructions cause the processor to use an Internet protocol (IP) for reception of the push notification, transmission of the request, and reception of the message.

7. The electronic device of claim 1, wherein the instructions cause the processor to:
   detect occurrence of an error for the message by using the first application program; and
   in response to detection of the occurrence of the error, provide a response message comprising a code indicating a cause of the error to the second application program.

8. The electronic device of claim 7, wherein the instructions cause the processor to detect the occurrence of the error for the message on the basis of at least one of whether it is possible to store the message on the basis of the remaining capacity of the memory, whether the message is received in duplicate, or whether it is possible to process a format of data included in the message, wherein the code indicating the cause of the error indicates one of an insufficient memory capacity, reception of the message in duplicate, or inability to process the format of data included in the message.

9. The electronic device of claim 7, wherein the instructions cause the processor to perform an operation corresponding to the code indicating the cause of the error by using the second application program, wherein the operation corresponding to the code indicating the cause of the error comprises at least one of providing the message to the first application program again, discarding the message, or transmitting a signal indicating a processing failure for the message to the external server.

10. The electronic device of claim 1, wherein the instructions cause the processor to:
    detect a user input to configure whether to allow reception of the message, via the user interface of the first application program; and
    transmit a signal indicating whether to allow reception of the message, which corresponds to the user input, to the external server.

11. A server device comprising:
    a network interface;
    at least one processor operatively connected to the interface; and
    at least one memory operatively connected to the processor, wherein the memory comprises instructions causing, when executed, the processor to:
    receive first message data in a non-short message service (non-SMS) format from an external server via the interface, wherein the first message data is transmitted to a plurality of mobile devices comprising phone numbers;
    transmit a push notification comprising an indication of the first message data to at least one mobile device corresponding to a part of the mobile devices via the interface using an Internet protocol at least partially on the basis of the phone numbers of the mobile devices;
    receive a request for the first message data from the at least one of the mobile devices via the interface using the Internet protocol;
    transmit the first message data in the non-SMS format to the at least one of the mobile devices via the interface using the Internet protocol; and
    provide the external server with information relating to remaining mobile devices, to which the push notification is not transmitted, via the interface at least partially on the basis of phone numbers of the remaining mobile devices.

12. The server device of claim 11, wherein the indication comprises identification information for the first message data, and the non-SMS format comprises a transport protocol data unit format.

13. The server device of claim 11, wherein the instructions cause the processor to determine at least one mobile device corresponding to the part of the mobile devices on the basis of at least one of a list of phone numbers receiving the first message data, a list of subscription phone numbers registered in a system, and a list of phone numbers rejecting to receive a message of the external server.

14. The server device of claim 11, wherein the instructions cause the processor to:
    receive a signal indicating a processing failure for the first message data from the at least one of the mobile devices via the interface using the Internet protocol; and
    provide the external server with information on the at least one of the mobile devices, which has transmitted the signal indicating the processing failure, to the external server.

15. An operation method of an electronic device, the method comprising:
    receiving a push notification from an external server via a communication circuit by using a second application program, wherein the push notification indicates a message for a first application program;
    transmitting a request for the message to the external server via the communication circuit by using the second application program;
    receiving the message from the external server via the communication circuit by using the second application program;
    providing the message to the second application program by using the second application program; and
    displaying the message by using a user interface of the first application program, wherein the second application program is a non-short message service (non-SMS) application program, and the first application program is an SMS application program.

* * * * *